US011791712B2

United States Patent
Amimoto et al.

(10) Patent No.: US 11,791,712 B2
(45) Date of Patent: Oct. 17, 2023

(54) POWER CONVERSION DEVICE

(71) Applicant: Mitsubishi Electric Corporation, Tokyo (JP)

(72) Inventors: Takeshi Amimoto, Tokyo (JP); Kikuo Izumi, Tokyo (JP); Tatsuya Okuda, Tokyo (JP); Tomoaki Kimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/975,408

(22) PCT Filed: Jan. 9, 2019

(86) PCT No.: PCT/JP2019/000290
§ 371 (c)(1),
(2) Date: Aug. 25, 2020

(87) PCT Pub. No.: WO2019/211929
PCT Pub. Date: Nov. 7, 2019

(65) Prior Publication Data
US 2021/0013796 A1    Jan. 14, 2021

(30) Foreign Application Priority Data

May 1, 2018   (JP) ................................. 2018-088279

(51) Int. Cl.
*H02M 1/32*   (2007.01)
*H02M 1/088*   (2006.01)
(Continued)

(52) U.S. Cl.
CPC ............. *H02M 1/32* (2013.01); *H02M 1/088* (2013.01); *H02M 1/36* (2013.01); *H02M 7/219* (2013.01);
(Continued)

(58) Field of Classification Search
CPC .. H02J 7/00; H02J 7/022; H02M 1/00; H02M 1/0054; H02M 1/088; H02M 1/32;
(Continued)

(56) References Cited

U.S. PATENT DOCUMENTS

2015/0280546 A1*  10/2015  Kouno .............. H02M 7/53871
                                                            363/132
2018/0248474 A1*   8/2018  Nishikawa ........ H02M 7/53873

FOREIGN PATENT DOCUMENTS

JP    2001-258264 A    9/2001
JP    2008-167524 A    7/2008
(Continued)

OTHER PUBLICATIONS

International Search Report and Written Opinion dated Mar. 26, 2019 for PCT/JP2019/000290 filed on Jan. 9, 2019, 8 pages including English Translation of the International Search Report.

*Primary Examiner* — Ryan Johnson
(74) *Attorney, Agent, or Firm* — XSENSUS LLP

(57) ABSTRACT

A power conversion device converts a direct-current power on the DC side of the power conversion device to an alternating-current power by an inverter circuit having a plurality of semiconductor switching elements, and outputs the AC power from the AC side of the power conversion device. A current detector detects a reactor current output from the inverter circuit. As overcurrent detector detects overcurrent in a control mode in which the reactor current is caused to follow a reactor current command value, control circuit starts an overcurrent mode in which a time period where the reactor current monotonically decreases is provided. In the overcurrent mode, whether to switch the overcurrent mode to the normal control mode is determined based on the reactor current or in accordance with a timing corresponding to a zero-cross point of a voltage or current on the AC side.

10 Claims, 10 Drawing Sheets

(51) Int. Cl.
*H02M 7/537* (2006.01)
*H02M 7/219* (2006.01)
*H02M 7/5395* (2006.01)
*H02M 7/797* (2006.01)
*H02M 1/36* (2007.01)

(52) U.S. Cl.
CPC ......... *H02M 7/537* (2013.01); *H02M 7/5395* (2013.01); *H02M 7/797* (2013.01)

(58) Field of Classification Search
CPC .. H02M 1/4208; H02M 3/00; H02M 3/33523; H02M 7/00; H02M 7/003; H02M 7/219; H02M 7/537; H02M 7/53873; H02M 7/5395; H02M 7/797; H02M 1/36; H02M 7/5387; H02M 7/53871; H02M 1/0009; H02M 1/0025; H02M 1/325; Y02B 70/00; Y02B 70/10; Y02B 70/1441; H02H 7/122; H02H 7/1227
USPC ....................................................... 363/131
See application file for complete search history.

(56) References Cited

FOREIGN PATENT DOCUMENTS

| | | |
|---|---|---|
| JP | 2013-162699 A | 8/2013 |
| WO | 2017/154334 A1 | 9/2017 |

\* cited by examiner

POWER CONVERSION DEVICE

CROSS-REFERENCE TO RELATED APPLICATIONS

The present application is based on PCT filing PCT/JP2019/000290, filed Jan. 9, 2019, which claims priority to JP 2018-088279, filed May 1, 2018, the entire contents of each are incorporated herein by reference.

TECHNICAL FIELD

The present disclosure relates to a power conversion device, and, more particularly, to a power conversion device having an inverter circuit for converting a direct-current power to an alternating-current power.

BACKGROUND ART

In general, an inverter for converting a direct-current (DC) power into an alternating-current (AC) power includes a filter reactor and a filter capacitor connected to an output of the inverter. In the event of overcurrent, the inverter is designed to detect the overcurrent and stops, in order to protect the inverter.

However, a grid-connected inverter connected to a commercial system, such as a power conversion device for photovoltaic power generation, requires that the inverter continues to operate, without stopping even in the event of disturbance in the system voltage. For this reason, in the event of system disturbance, a sudden change in system voltage may cause overcurrent in output current of the inverter. In that case also, a control is required that causes the inverter to continue to operate.

Japanese Patent Laying-Open No. 2013-162699 (PTL 1) discloses a control of performing a gate block to turn off a gate signal to an inverter circuit included in a distributed power supply system for a predetermined amount of time, and reducing a current command value to the inverter circuit, in response to a voltage sag occurred in the AC power system, and releasing the gate block in response to the return of the AC power system voltage and gradually increasing the reduced current command value.

CITATION LIST

Patent Literature

PTL 1: Japanese Patent Laying-Open No 2013-162699

SUMMARY OF INVENTION

Technical Problem

However, in the event of overcurrent, the control over the inverter circuit in PTL 1 releases the gate block on the inverter circuit with an elapse of a predetermined amount of time. For this reason, even though the current command value of the inverter circuit is reduced, the actual current is still large when the operation of the inverter circuit resumes. Thus, overcurrent may occur again. For this reason, in the event of overcurrent, the inverter circuit may not be able to continue to operate in a stable manner.

The present disclosure is made to solve such a problem, and an object of the present disclosure is to provide a power conversion device which includes an inverter circuit that continues to operate in a stable manner even in the event of overcurrent of the inverter circuit.

Solution to Problem

A power conversion device according to a certain aspect of the present disclosure includes an inverter circuit, a current detector, a control circuit, and a drive circuit. The inverter circuit includes a plurality of semiconductor switching elements and converts a direct-current (DC) power on a DC side of the power conversion device to an alternating-current (AC) power and outputs the AC power from an AC side of the power conversion device. The current detector detects an AC current output from the AC side. The control circuit controls operation of the inverter circuit, based on the AC current detected by the current detector. The drive circuit controls on and off of the plurality of semiconductor switching elements, in accordance with a control signal from the control circuit. When the control circuit is in a first control mode of controlling the inverter circuit so that the AC current follows an AC current command value, if the AC current increases greater than a predetermined overcurrent threshold, the control circuit switches from the first control mode to a second control mode and controls the inverter circuit under the second control mode. Furthermore, when the control circuit is in the second control mode, the control circuit controls the inverter circuit so that a current decrease period is provided in which the on and off of the plurality of semiconductor switching elements are controlled so that the AC current monotonically decreases, by stopping a first switching operation in which on and off of the plurality of semiconductor switching elements are controlled so that the AC current follows the AC current command value. After The control circuit has switched to the second control mode, the control circuit ends the second control mode, and switches to the first control mode, based on the AC current or in accordance with a timing corresponding to a zero-cross point of a voltage or current on the AC side, to control the inverter circuit under the first control mode.

Advantageous Effects Of Invention

According to the present disclosure, in the event of overcurrent in the inverter circuit, the control circuit can reduce the AC current (the output current) by switching to the second control mode in which the current decrease period is provided, and return from the second control mode to the first control mode for the normal operation by selecting a timing, at which the output current is small, by monitoring the output current or synchronizing with a zero-cross point of the current or voltage. As a result, in the event of overcurrent in the power conversion device which includes the inverter circuit, the operation of the inverter circuit is allowed to continue in a stable manner.

DESCRIPTION OF EMBODIMENTS

Figure 1:
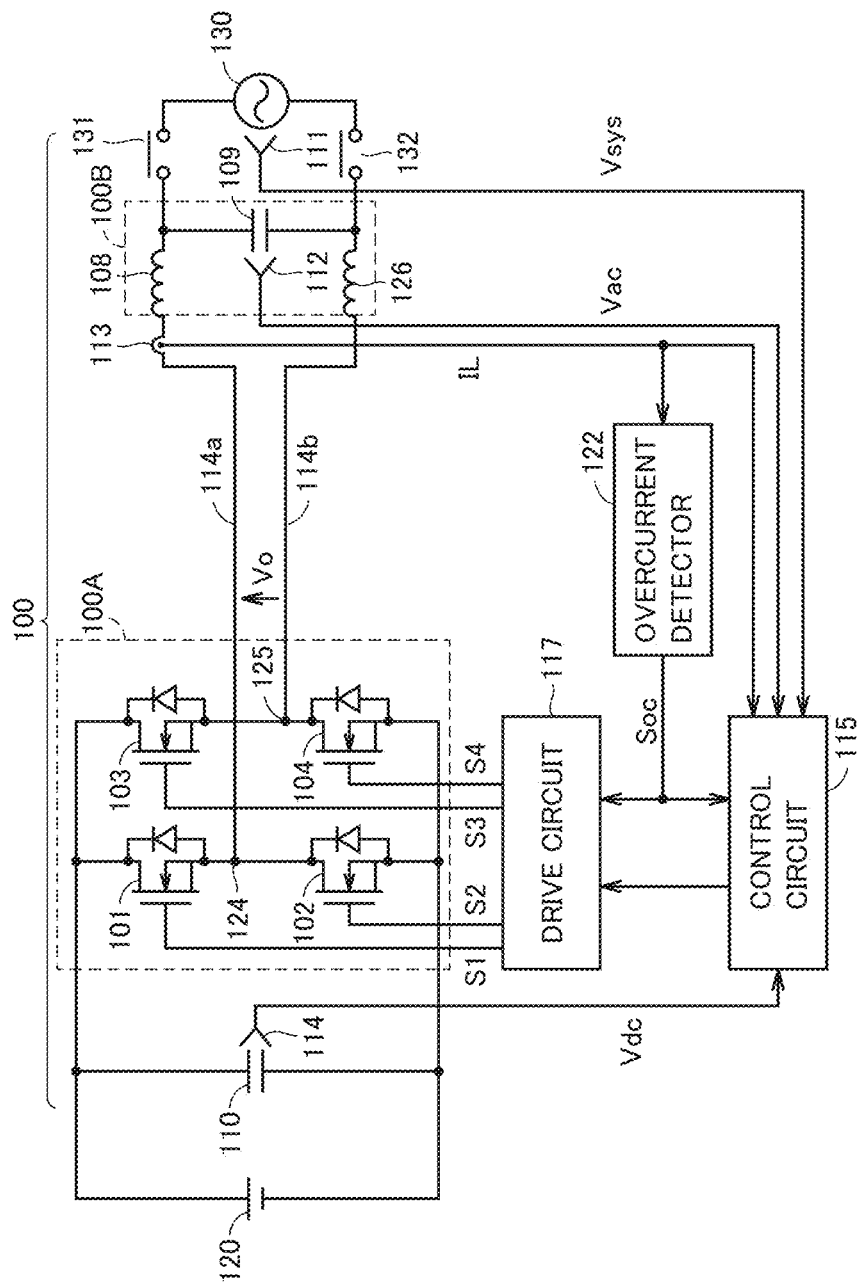
FIG. 1 is a circuit diagram showing a configuration of a power conversion device according to Embodiment 1.

Hereinafter, embodiments according to the present disclosure will be described, with reference to the accompanying drawings. Note that, in the following, the same reference sign is used to refer to the same or corresponding component in the drawings, and description thereof will in principle not be repeated.

Embodiment 1

(Circuit Structure)

FIG. 1 is a circuit diagram showing a configuration of a power conversion device according to Embodiment 1.

Referring to FIG. 1, a power conversion device 100 according to Embodiment 1 includes a full-bridge inverter circuit 100A, as a main circuit, which converts a direct-current (DC) power into an alternating-current (AC) power, a smoothing capacitor 110 for DC voltage, and an output filter circuit 100B. Inverter circuit 100A includes semiconductor switching elements 101 to 104. Output filter circuit 100B includes reactors 108, 126 and a capacitor 109. Power conversion device 100 further includes a control circuit 115 for controlling inverter circuit 100A, a drive circuit 117, and an overcurrent detector 122.

A DC power supply 120 is connected in parallel with smoothing capacitor 110 on the DC side of power conversion device 100. On the AC side of power conversion device 100, in contrast, commercial system 130 is connected in parallel with capacitor 109 included in output filter circuit 100B.

Semiconductor switching elements 101 to 104 each have a positive electrode and a negative electrode, and a control electrode. As semiconductor switching elements 101 to 104, any self turn-off semiconductor device is applicable which can form (on) and block (off) a current path between the positive electrode and the negative electrode, depending on a voltage or current of the control electrode. For example, if the semiconductor switching element is a MOSFET (Metal-Oxide-Semiconductor Field-Effect Transistor), the positive electrode means the drain electrode, the negative electrode means the source electrode, and the control electrode means the gate electrode. If the semiconductor switching element is an IGBT (Insulated Gate Bipolar Transistor), in contrast, the positive electrode means the emitter electrode, the negative electrode means the collector electrode, and the control electrode means the gate electrode.

The positive side of DC power supply 120 is connected to the positive voltage side of smoothing capacitor 110, the positive electrode of semiconductor switching element 101, and the positive electrode of semiconductor switching element 103. The negative side of DC power supply 120 is connected to the negative side of smoothing capacitor 110, the negative electrode of the semiconductor switching element 102, and the negative electrode of the semiconductor switching element 104.

The negative electrode of semiconductor switching element 101 and the positive electrode of the semiconductor switching element 102 are connected at a connection point 124. The negative electrode of semiconductor switching element 103 and the positive electrode of the semiconductor switching element 104 are connected at a connection point 125. In the following, semiconductor switching element 101 and semiconductor switching element 103 will also be referred to as "upper-arm element." Semiconductor switching elements 102 and 104 will also be referred to as "lower-arm element." In the following, a voltage difference caused between connection points 124 and 125 will also be referred to as an inverter output voltage Vo.

Connection point 124 is connected via a power line 114a to one end of reactor 108 included in output filter circuit 100B. Connection point 125 is connected via a power line 114b to one end of reactor 126 included in output filter circuit 100B. The other end of reactor 108 and the other end of reactor 126 are electrically connected together via capacitor 109 included in output filter circuit 100B. Commercial system 130 is connected in parallel with capacitor 109 via relays 131, 132.

Arranging the relays 131, 132 enable commercial system 130 and power conversion device 100 to be disconnected from each other. For noise suppression, for example, a common-mode noise filter and a differential-mode noise filter may further be disposed between capacitor 109 included in output filter circuit 100B and commercial system 130 and between DC power supply 120 and smoothing capacitor 110.

While the output power of DC power supply 120 is directly supplied to smoothing capacitor 110 included in power conversion device 100 in FIG. 1, DC-to-DC power conversion may be performed between DC power supply 120 and smoothing capacitor 110. For example, if DC power supply 120 is a solar cell, DC power supply 120 can be configured to supply power conversion device 100 with DC power whose voltage is stabilized by a DC-to-DC converter (not shown) disposed between DC power supply 120 and smoothing capacitor 110. If DC power supply 120 is a fuel cell, an isolated DC-DC converter can be arranged in a similar manner.

Note that if DC power supply 120 is a storage battery, the output voltage of the storage battery can be converted by a similarly-arranged DC-to-DC converter (not shown) and supplied to power conversion device 100. Alternatively, the storage battery can be charged with power from power conversion device 100. In this case, power conversion device 100 operates to convert AC power to DC power, in addition to converting DC power to AC power. Furthermore, DC power supply 120 can be configured of a combination of an AC power supply, such as wind power generator, and a converter which converts AC power from the AC power supply to DC power. Note that the present embodiment is also applicable to power conversion devices for electric vehicle (EV). In that case, a battery included in the electric vehicle is used as DC power supply 120.

For example, an electrolytic capacitor, a film capacitor, and a ceramic capacitor can be used as smoothing capacitor 110. Alternatively, an electric double layer capacitor or lithium-ion battery, which is a power storage element, may be additionally connected to smoothing capacitor 110.

While semiconductor switching elements 101 to 104 are each configured of a MOSFET in FIG. 1, they may be each configured of an IGBT and a freewheeling diode connected in antiparallel to the IGBT. Note that if a MOSFET is used, while the build-in body diode can be used as a freewheeling diode, the MOSFET can be connected in antiparallel to a diode to form a freewheeling diode. Besides silicon (Si), silicon carbide (SiC) or gallium nitride (GaN), which is a wide band gap semiconductor, is applicable as a material from which the semiconductor switching element is formed. The application of a wide band gap semiconductor can reduce conduction losses and switching losses, as compared to applying a semiconductor made of silicon material.

While reactors 108 and 126 included in output filter circuit 100B are denoted as separate elements in FIG. 1, reactors 108 and 126 may be configured of a coupled reactor element in which multiple windings are magnetically coupled by the same core.

As described above, since the use of a wide band gap semiconductor as a material of semiconductor switching elements 101 to 104 can reduce switching losses, the switching frequency can be increased under the same heat load of power conversion device 100. An increased frequency as such reduces the current ripple amplitude at output filter circuit 100B, thereby allowing size reduction and cost reduction of output filter circuit 100B owing to reduction in inductance of reactors 108 and 126. In contrast, if the inductance value in output filter circuit 100B reduces, power conversion device 100 may be susceptible to disturbance of commercial system 130 upon its occurrence. However, such effects are expected to be reduced in a controlled manner by accelerating the operation by the control circuit with the increase of the switching frequencies of the semiconductor switching elements.

However, if the control operation performed in each switching cycle under low frequency is performed in each switching cycle at a higher frequency, a higher operation speed of the control circuit is required. In contrast, if a conventional control circuit is used as is, without increasing the operation speed, what is called the decimation control may be required in which the control operation, conventionally taking one cycle, is performed taking multiple switching cycles. In this case, if the switching frequency is increased as described above, the control stability with respect to the disturbance in commercial system 130 may decrease.

As shown in FIG. 1, voltage detectors 111, 112, 114 and a current detector 113 are disposed as a detection unit for controlling the operation of power conversion device 100. Voltage detector 114 detects a voltage Vdc of smoothing capacitor 110. Voltage detector 111 detects a voltage Vsys (hereinafter, also referred to as a system voltage Vsys) of the commercial system. Voltage detector 112 detects a voltage Vac of capacitor 109 included in output filter circuit 100B. Current detector 113 detects a reactor current IL of reactor 108 included in output filter circuit 100B. Voltage Vdc, voltage Vsys, voltage Vac, and a detection value of reactor current IL are input to control circuit 115.

Reactor current IL corresponds to "AC current" output from the AC side of inverter circuit 100A. Note that reactor current IL can be detected even if current detector 113 is disposed for reactor 126. Voltage Vac of capacitor 109 corresponds to "AC voltage" on the AC side of inverter circuit 100A.

Using voltage Vdc, voltage Vsys, voltage Vac, and the detection value of reactor current IL, control circuit 115 generates a control signal for controlling on and off of semiconductor switching elements 101 to 104. Drive circuit 117 generates drive control signals S1 to S4 for respective semiconductor switching elements 101 to 104, in accordance with the control signal from control circuit 115. As drive control signals S1 to S4 are input to the control electrodes of semiconductor switching elements 101 to 104, semiconductor switching elements 101 to 104 are each enabled to turn on and turned off The detection value of reactor current IL is also input to overcurrent detector 122. Based on reactor current IL, overcurrent detector 122 generates an overcurrent detection signal Soc. Overcurrent detection signal Soc is input to control circuit 115 and drive circuit 117.

(Stationary Operation)

Next, an operation of reversely flowing the energy of DC power supply 120 to commercial system 130 will be described as a stationary operation of power conversion device 100.

Figure 2:
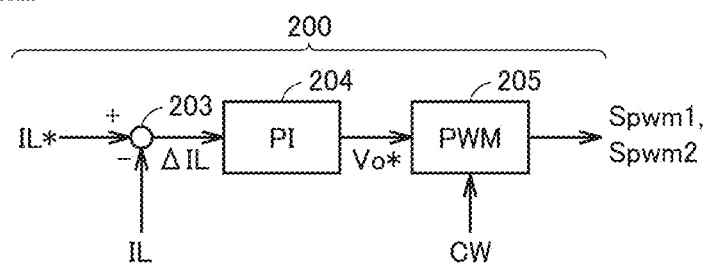
FIG. 2 is a functional block diagram showing one example control configuration of the power conversion device of FIG. 1.

FIG. 2 is a functional block diagram illustrating one example control configuration of power conversion device 100.

Referring to FIG. 2, a controller 200 for causing power conversion device 100 to operate in a stationary state, includes an operation unit 203, a proportional-integral controller 204, and a PWM (Pulse Width Modulation) signal converter 205. Each of the functional blocks included in controller 200 is implemented by, for example, software processing and/or hardware processing performed by a microcomputer included in control circuit 115.

Operation unit 203 computes a current deviation $\Delta IL$ of the actual reactor current IL, detected by current detector 113, from reactor current command value IL*. Reactor current command value IL* is set to a sinusoidal current which has the same frequency as commercial system 130. Furthermore, reactor current command value IL* is set to have a phase whose phase difference from the phase of system voltage Vsys is constant. In particular, if the phase difference is zero, the power factor can be controlled to 1.0. Reactor current command value IL* corresponds to "AC current command value."

Note that reactor current command value IL* (sine wave) can be set so that the amplitude of reactor current command value IL* is in correspondence with an operating point at which, for example, the output power of DC power supply 120 is at maximum, or so that the output voltage of DC power supply 120 is controlled constant. If the power that can reversely flow to commercial system 130 is limited by a higher-level system, the amplitude and phase of reactor current command value IL* are set so as to meet the limitation. As such, the way of setting reactor current command value IL* to exhibit an alternating-current waveform is not particularly limited.

Proportional-integral controller 204 generates an inverter control command value Vo* through the control operation for reducing current deviation $\Delta IL$ calculated by operation unit 203. Inverter control command value Vo* corresponds to a command value for inverter output voltage Vo between connection points 124 and 125 of FIG. 1.

For example, proportional-integral controller 204 can determine inverter control command value Vo* by a feedback operation of adding the proportional term (Kp*ΔIL), obtained by multiplying the current deviation by the proportional gain Kp, and the integral term (Ki*Σ(ΔIL)), obtained by multiplying the integral of the current deviation by the integral gain. Alternatively, the feedback operation can further be combined with a feedforward control. For example, inverter control command value Vo* can be determined by further adding a feedforward term according to voltage Vdc of smoothing capacitor 110 to a result of the feedback operation.

With this, proportional-integral controller 204 calculates inverter control command value Vo* so that reactor current IL follows reactor current command value IL*. With cyclic changes in reactor current command value IL*, inverter control command value Vo* results in an alternating-current waveform that, basically, has the same frequency as reactor current command value IL*.

PWM signal converter 205 generates a PWM signal for controlling inverter output voltage Vo to inverter control command value Vo*.

Figure 3:
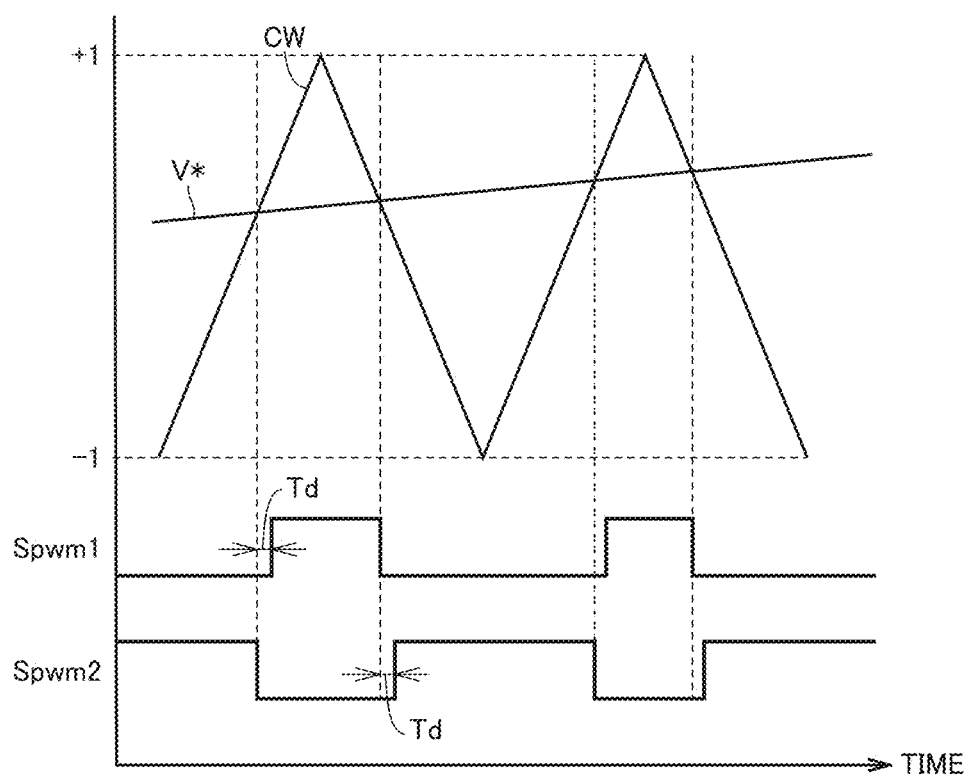
FIG. 3 is a schematic waveform diagram for illustrating an operation of a PWM signal converter shown in FIG. 2.

FIG. 3 is a schematic waveform diagram for illustrating an operation of PWM signal converter 205.

Referring to FIG. 3, PWM signal converter 205 divides inverter control command value Vo* by voltage Vdc of smoothing capacitor 110, thereby normalizing inverter control command value Vo*. This yields PWM voltage command V* normalized to a numeric value within a range of inverter control command value Vo* from −1 to +1.

PWM signal converter 205 generates PWM signals Spwm1 and Spwm2 in accordance with a voltage comparison between the normalized PWM voltage command V* and a carrier wave CW which varies within a range from −1 to +1 at a certain frequency. Basically, in a period in which PWM voltage command V* is lower than the voltage of carrier wave CW, PWM signal Spwm1 is set to a logic high level (hereinafter, simply referred to as "H level") and PWM signal Spwm2 is set to a logic low level (hereinafter, simply referred to as "L level"). In contrast, in a period in which PWM voltage command V* is higher than the voltage of carrier wave CW, PWM signal Spwm1 is set to L level and PWM signal Spwm2 is set to H level.

In a period in which PWM signal Spwm1 is at H level, drive control signals S1 and S4 are set to H level so that semiconductor switching elements 101 and 104 turn on. This causes drive circuit 117 to apply, for example, +5V to the control electrodes of semiconductor switching elements 101 and 104. Conversely, in a period in which PWM signal Spwm1 is at L level, drive control signals S1 and S4 are set to L level so that semiconductor switching elements 101 and 104 turn off. This causes drive circuit 117 to apply, for example, +0V (GND) to the control electrodes of semiconductor switching elements 101 and 104.

In contrast, in a period in which PWM signal Spwm2 is at H level, drive control signals S2 and S3 are set to H level so that semiconductor switching elements 102 and 103 turn on. This causes drive circuit 117 to apply, for example, +5V to the control electrodes of semiconductor switching elements 102 and 103. Conversely, in a period in which PWM signal Spwm2 is at L level, drive control signals S2 and S3 are set to L level so that semiconductor switching elements 102 and 103 turn off. This causes drive circuit 117 to apply, for example, +0V (GND) to the control electrodes of semiconductor switching elements 102 and 103.

Note that, in general, a dead time Td is given between PWM signals Spwm1 and Spwm2, as shown in FIG. 3. As is well known, the dead time can prevent a short-circuit path from being formed by the upper-arm element and the lower-arm element turning on simultaneously due to, for example, element variations. The duration of dead time Td is about a few microseconds for a general semiconductor switching element. For a semiconductor switching element capable of high-speed switching, such as a wide band gap semiconductor, the duration may be shorten to about a few nanoseconds to several hundreds of nanoseconds.

The frequency of carrier wave CW coincides with the switching frequencies of semiconductor switching elements 101 to 104. In general, the switching frequency is often 15 kHz or higher so as to go beyond human hearing range. For example, for a power conversion device which outputs power of about a few kilowatts, the switching frequency is, in general, about several tens of kilohertz. While the triangular wave is illustrated as carrier wave CW in the present embodiment, any other cyclic waveform, such as a sawtooth wave, can also be used as carrier wave CW.

Note that while the ranges of carrier wave CW and PWM voltage command V* are from −1 to +1 in FIG. 3, carrier wave CW and PWM voltage command V* can be generated which are within ranges from 0 to +1, for example.

As described above, the operation of simultaneously turning semiconductor switching elements 101 and 104 on and off and simultaneously turning semiconductor switching elements 102 and 103 on and off will be referred to as a bipolar modulation operation. In other words, as described above, the bipolar modulation operation is performed by turning semiconductor switching elements 101 and 104 on and off in accordance with PWM signal Spwm1 and turning semiconductor switching elements 102 and 103 on and off in accordance with PWM signal Spwm2.

In the bipolar modulation operation, ignoring the dead time, there is a relation as indicated by the following Equation (1) between a DC bus voltage (voltage Vdc), a commercial system voltage (voltage Vsys), a cycle Tcw of carrier wave CW (the reciprocal of the carrier frequency), and an on-time Ton of the semiconductor switching element.

$$\text{Ton}=(1+Vsys/Vdc)/2 \times Tcw \qquad (1)$$

According to Equation (1), when the instantaneous voltage of commercial system 130 is zero (Vsys=0), Ton=0.5× Tcw is true, yielding the duty cycle of 50%. Note that Ton in Equation (1) is on-time of semiconductor switching elements 101 and 104, and, ignoring the dead time, on-time of semiconductor switching elements 102 and 103 can be determined by Tcw−Ton.

As the commercial system voltage (voltage Vsys) positively increases, the duty cycles of semiconductor switching elements 101 and 104 increase from 50% and the duty cycles of semiconductor switching elements 102 and 103 decrease from 50%, according to Equation (1). Conversely, as the commercial system voltage (voltage Vsys) negatively increases, the duty cycles of semiconductor switching elements 101 and 104 decrease from 50% and the duty cycles of semiconductor switching elements 102 and 103 increase from 50%.

Note that semiconductor switching elements 101 to 104 can also be controlled by, what is called, a unipolar modulation operation different from the bipolar modulation. In the unipolar modulation operation, semiconductor switching elements 101 and 102 turn on and off in accordance with PMW the signals Spwm1 and Spwm2 of FIG. 3 and semiconductor switching elements 103 and 104 turn on and off in accordance with the polarity of PWM voltage command V*. Specifically, semiconductor switching element 103 turns on (104 is off) in half a cycle where V*>0 is true, whereas the semiconductor switching element 104 turns on (103 is off) in half a cycle where V*<0 is true, thereby causing semiconductor switching elements 103 and 104 to turn on and off in accordance with the frequency of commercial system 130.

In the unipolar modulation operation, semiconductor switching elements 103 and 104 are switched for a reduced number of times, yielding a benefit that the switching losses are reduced. There are also drawbacks, on the other hand, such as an increase in leakage current. Thus, it is preferable to determine whether the unipolar modulation operation is applicable or not, based on operational conditions, such as a leakage current allowance.

While FIG. 3 illustrates a waveform diagram in which PWM voltage command V* and carrier wave CW continuously vary, it should be noted that, in practice, PWM signal converter 205 also operates as a digital circuit if control circuit 115 is configured of digital equipment, such as a microcomputer.

Figure 4:
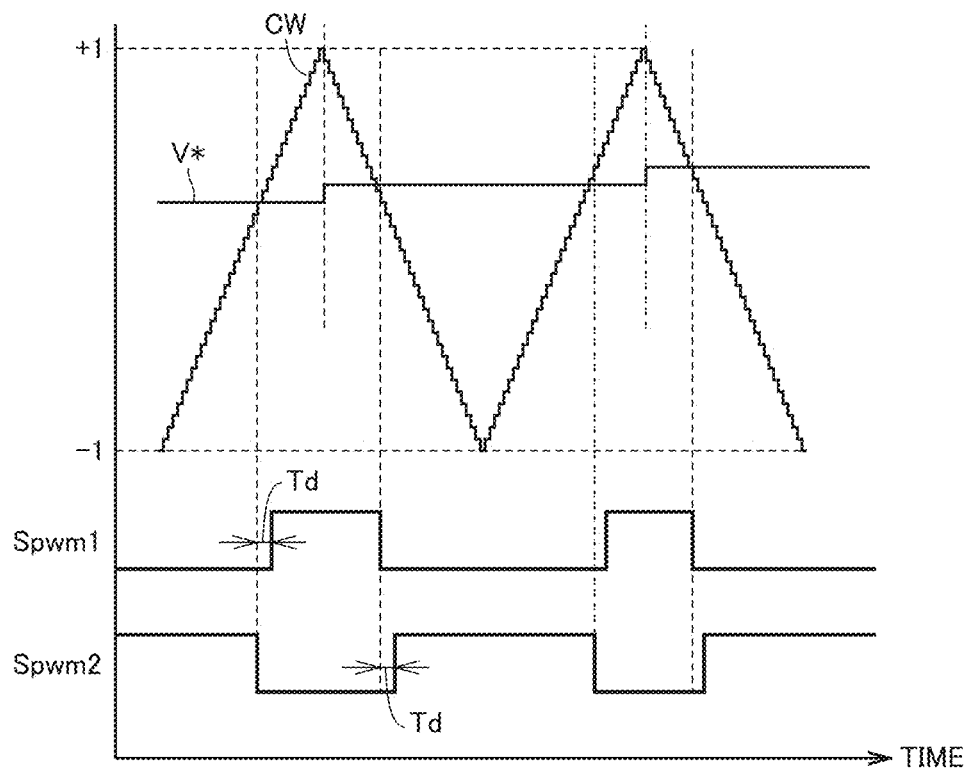
FIG. 4 is a schematic waveform diagram for illustrating an operation of the PWM signal converter that is configured of a digital circuit.

FIG. 4 shows a schematic waveform diagram for illustrating an operation of PWM signal converter 205 that is configured of a digital circuit.

Referring to FIG. 4, carrier wave CW is generated by counting up or down the numeric value by a counter or the like for each control cycle. Similarly, PWM voltage command V* changes in a stepwise manner for each control cycle, upon execution of the control operation. Accordingly, the voltage values of carrier wave CW and PWM voltage command V*, in practice, change in a stepwise manner.

While the timing at which PWM voltage command V* is updated is the timing of a peak (a maximum point) of carrier wave CW in the example of FIG. 4, it should be noted that PWM voltage command V* can be updated at other timing (e.g., a valley (a minimum point) of carrier wave CW or both a peak and a valley). Alternatively, the timing at which PWM voltage command V* is updated can be provided, without synchronizing the update timing with carrier wave CW.

Updating PWM voltage command V* in synchronization with carrier wave CW allows the control operation by proportional-integral controller 204 to be performed in synchronization with carrier wave CW, using an average of the current or an average of the voltage within the carrier period. In contrast, such a cyclic control operation allows PWM voltage command V* to be changed only for each carrier period. Thus, the control operation may lag behind a sudden change in the voltage or current part way through the carrier period.

Referring again to FIGS. 1 and 2, PWM signals Spwm1, Spwm2 generated by PWM signal converter 205 as described above are output to drive circuit 117. In accordance with PWM signals Spwm1, Spwm2, drive circuit 117 generates drive control signals S1 to S4, thereby causing semiconductor switching elements 101 to 104 to switch in accordance with the PWM control so that reactor current IL follows reactor current command value IL*.

While FIG. 3 has been described with reference to the feedback control by proportional integral (PI) controller 204 and the combination of the feedback control and the feedforward control, it should be noted that the feedback control can be performed by the proportional (P) control only or by proportional-integral-derivative (PID) control.

(Operation Upon Detection of Overcurrent)

Next, an operation of power conversion device 100 in the event of overcurrent will be described.

Referring again to FIG. 1, examples of a cause of overcurrent include an occurrence of disturbance in commercial system 130. For example, in the event of a ground fault or a line-to-line short circuit in the system, the voltage of commercial system 130 abruptly decreases. In particular, when the system voltage (Vsys) abruptly decreases at a timing at which the voltage swing is large where the phase of the system voltage is 90 degrees or 270 degrees, etc. the variation of the voltage is large, which greatly affects power conversion device 100. The variation in the system voltage changes the slopes of reactor currents IL of reactors 108 and 126 included in output filter circuit 100B. Using the DC bus voltage (voltage Vdc), the commercial system voltage (voltage Vsys), and the sum of inductances of reactors 108 and 126, the following Equation (2) holds true for slope k (IL) of reactor current IL.

$$k(IL)=(Vdc-Vsys)/L \qquad (2)$$

As described above, for changes in the DC bus voltage (voltage Vdc) and system voltage Vsys of commercial system 130, controller 200 controls the on-time of semiconductor switching elements 101 to 104 according to Equation (1), to control reactor current IL. However, as system voltage Vsys changes abruptly, the value of the numerator in Equation (2) increases abruptly, causing an increased slope of the reactor current.

For example, if disturbance occurs in commercial system 130 and system voltage Vsys decreases while power is being sent from the DC side to the AC side where the system voltage is a positive voltage (Vsys>0) and semiconductor switching elements 101 and 103 are on, the rate of increase of the current in a path increases, the path passing through: the positive side of smoothing capacitor 110 to semiconductor switching element 101 to reactor 108 to commercial system 130 to reactor 126 to semiconductor switching element 103, and to the negative side of smoothing capacitor 110. For this reason, the on/off control in accordance with the PWM control for the stationary operation makes the on-time of semiconductor switching elements 101, 103 excessive, and an increased reactor current causes overcurrent. If the overcurrent is prominent, the semiconductor switching element may end up being destroyed.

In the present embodiment, overcurrent is detected if reactor current IL is higher than a predetermined overcurrent threshold.

Figure 5:
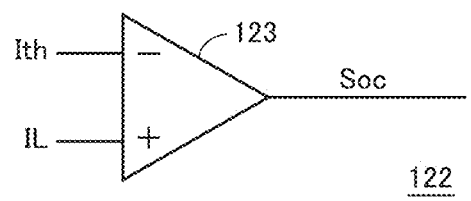
FIG. 5 is a circuit diagram showing an example configuration of an overcurrent detector shown in FIG. 1.

FIG. 5 shows an example configuration of overcurrent detector 122.

Referring to FIG. 5, overcurrent detector 122 has a comparator 123 which receives reactor current IL detected by current detector 113 and overcurrent threshold Ith.

For example, when |IL|>Ith is true, comparator 123 detects overcurrent and sets overcurrent detection signal Soc to H level. When |IL|≤Ith is true, in contrast, comparator 123 detects no overcurrent and keeps overcurrent detection signal Soc at L level.

Overcurrent threshold Ith can be set arbitrarily, taking into account the rated values of power conversion device 100, etc. For example, based on the operating conditions of power conversion device 100, overcurrent threshold Ith can be set within a range from 100% to 150% of the maximum current value of reactor current IL under the rated operating conditions. Alternatively, based on the elements included in power conversion device 100, for example, overcurrent threshold Ith can be set to a current value with a certain (e.g., about 20%) margin to the rated current of semiconductor switching elements 101 to 104. Overcurrent threshold Ith can also be set to a current value that is lower by about 10% than the overcurrent value at which power conversion device 100 should be shut down for protection shutdown.

Note that the overcurrent detection scheme above is merely an example. The overcurrent can be detected by another detection scheme. For example, overcurrent can be detected by adding the current detector in series with semiconductor switching elements 101 to 104. In this case, the current detector can be disposed for one of any of the semiconductor switching elements or for multiple semiconductor switching elements. In these cases also, the detection by the current detector is input to overcurrent detector 122 and, as overcurrent detector 122 detects overcurrent, overcurrent detection signal Soc is set at H level.

As described above, if the PWM control for the stationary operation continues upon the detection of overcurrent, the overcurrent may continue. For this reason, in power conversion device 100 according to the present embodiment, when overcurrent is detected, the control mode is switched from the PWM control mode, which is the control mode for the stationary operation, to another control mode.

Figure 6:
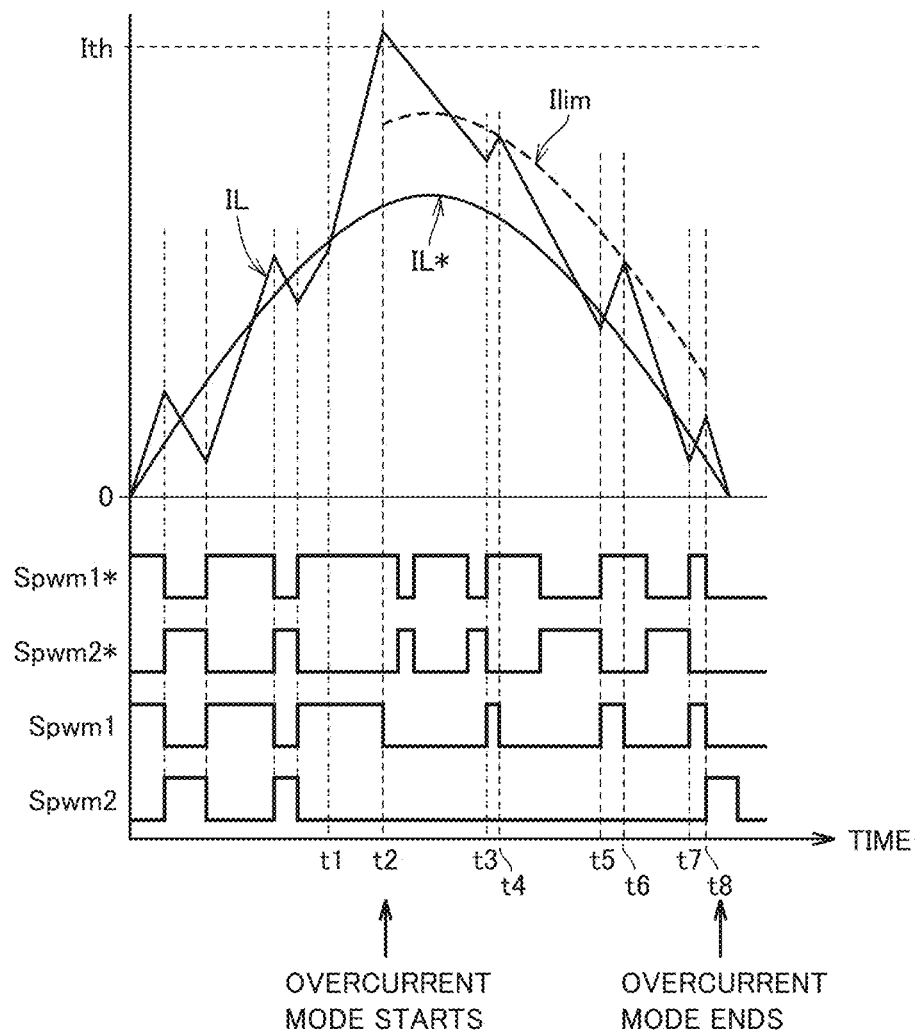
FIG. 6 is a schematic waveform diagram for illustrating switching of a control mode when overcurrent is detected in the power conversion device according to Embodiment 1.

FIG. 6 is a schematic waveform diagram for illustrating the control mode switching upon the detection of overcurrent in power conversion device 100 according to Embodiment 1. In FIG. 6, the switching frequency (i.e., the frequency of carrier wave CW) is denoted as being lower than it is in practice for notational convenience. In practice, the frequency of reactor current command value IL* is 50 or 60 Hz, while the switching frequency is several tends of kilohertz. While dead time Td, described with reference to FIG. 3, is not depicted in FIG. 6, dead times similar to those shown in FIG. 3 are provided to PWM signals Spwm1, Spwm2. FIG. 6 illustrates the control operation where system voltage Vsys, reactor current command value IL*, and reactor current IL are all positive values.

Referring to FIG. 6, reference PWM signals Spwm1*, Spwm2* are generated by PWM conversion for matching reactor current IL to reactor current command value IL*. In other words, PWM signals Spwm1*, Spwm2* are generated in accordance with the voltage comparison between carrier wave CW and PWM voltage command V* described with respect to FIG. 3. Accordingly, PWM signals Spwm1*, Spwm2* are cyclic pulse signals in accordance with a carrier wave CW cycle, in which the ratio of the H level period (the duty ratio) of the cyclic pulse signal varies for each cycle according to the PWM control. PWM signals Spwm1*, Spwm2* correspond to one embodiment of a "control pulse signal."

In contrast, PWM signals Spwm1, Spwm2 are output from control circuit 115 to drive circuit 117, and drive circuit 117 controls on and off of semiconductor switching elements 101 to 104 in accordance with PWM signals Spwm1, Spwm2. In other words, PWM signals Spwm1, Spwm2 correspond to one embodiment of "control signal."

Reactor current IL increases in an H level period (semiconductor switching elements 101 and 103 are on) of PWM signal Spwm1, while it decreases in an L level period of PWM signal Spwm1 (semiconductor switching elements 101 and 103 are off), thereby being controlled so as to follow reactor current command value IL*, while having a ripple component. In the stationary operation in which no overcurrent is detected, PWM signals Spwm1*, Spwm2*, as they are, are output as PWM signals Spwm 1, Spwm2 from control circuit 115.

Here, at time t1, reactor current IL increases due to an occurrence of system disturbance, and, at time t2, IL>Ith is true and overcurrent detector 122 thus detects overcurrent. Due to this, the control mode is switched from the PWM control mode for the stationary operation to the overcurrent mode, in response to overcurrent detection signal Soc from overcurrent detector 122. In other words, the PWM control mode for the stationary operation corresponds to one embodiment of "first control mode," and the overcurrent mode corresponds to "second control mode."

Note that, in practice, there is a certain delay time (in general, about several hundreds of nanoseconds to several nanoseconds) from the time of the occurrence of overcurrent until overcurrent detection signal Soc is changed to H level by comparator 123. Accordingly, overcurrent threshold Ith needs to be set at the design phase, taking this delay time into account.

In the overcurrent mode, a current upper limit Ilim is further set, which is within a range greater than reactor current command value IL* and less than overcurrent threshold Ith. In the present embodiment, current upper limit Ilim is a current that is greater than reactor current command value IL* by α (A). For example, α (A) can be about several amperes. Due to this, Ilim can be IL*+α when IL*>0 is true, while Ilim can be IL*−α when IL*<0 is true.

Current upper limit Ilim can be set by adding, to reactor current command value IL*, the current ripple of reactor current IL that is comparable to that while the PWM control is being performed in a stationary state or the maximum current ripple allowable in a stationary state. Current upper limit Ilim can also be set by multiplying reactor current command value IL* by k (k>1). Furthermore, current upper limit Ilim can be a current value that decreases at a constant rate from overcurrent threshold Ith, irrespective of reactor current command value IL*, or a constant value that is lower than overcurrent threshold Ith. As such, current upper limit Ilim is set in conjunction with reactor current command value IL* so as to fall within a range greater than reactor current command value IL* and less than overcurrent threshold Ith.

In the overcurrent mode, if reactor current IL is greater than current upper limit Ilim, semiconductor switching elements 101 to 104 are all turned off and the switching operation according to the PWM control (hereinafter, also referred to as "PWM switching operation") stops. For example, since IL>Ilim is true at time t2 (IL=Ith), PWM signals Spwm1 and Spwm2 are determined to be at L level, irrespective of reference PWM signals Spwm1*, Spwm2*. The PWM switching operation corresponds to "first switching operation."

After time t2, the PWM switching operation is stopped. In Embodiment 1, in the PWM switching operation stop period during the overcurrent mode, semiconductor switching elements 101 to 104 are off and thus reactor current IL decreases. Even if reactor current IL decreases lower than current upper limit Ilim, at which timing the PWM switching operation does not resume instantly. Rather, whether to resume the PWM switching operation or not is determined in synchronization with PWM signals Spwm1*, Spwm2*, that is, at a timing at which PWM signal Spwm1* or Spwm2* transitions from L level to H level.

For example, in FIG. 6, after the PWM switching operation is stopped by IL>Ilim being sensed, the PWM switching operation resumes at a timing the PWM signal Spwm1* changes from L level to H level. Due to this, at time t3, the PWM switching operation resumes and semiconductor switching elements 101, 103 turn on in an H level period of PWM signal Spwm1 corresponding to an H level period of PWM signal Spwm1*. Due to this, reactor current IL increases again after time t3.

As a result, as reactor current IL reaches current upper limit Ilim again at time t4, PWM signals Spwm1, Spwm2 are forced to be set at L level, and the PWM switching operation stops. Due to this, semiconductor switching elements 101 to 104 are turned off and reactor current IL thereby decreases after time t4. Thus, IL<Ilim is true.

Next, at time t5 at which PWM signal Spwm1* changes from L level to H level, PWM signal Spwm1 is set at H level, in accordance with PWM signal Spwm1*, and the PWM switching operation resumes. Semiconductor switching elements 101 and 103 are turned on and reactor current IL increases again.

As with time t4, at time t6, as reactor current IL reaches current upper limit Ilim, the PWM switching operation is stopped again. Due to this, reactor current IL turns to decrease again. As such, in FIG. 6, the PWM switching operation stops and semiconductor switching elements 101 to 104 are turned off during the periods from time t2 to t3, from time t4 to t5, and from time t6 to t7, thereby providing "current decrease period" in which reactor current IL monotonically decreases.

As with time t5, IL<Ilim is true at time t7, and PWM signal Spwm1 is thus set at H level in accordance with PWM signal Spwm1*, and the PWM switching operation resumes.

Then, at time t8, PWM signal Spwm1* changes from H level to L level, at which timing the reactor current IL does not reach current upper limit Ilim. In other words, reactor current IL has not increased to current upper limit Ilim, even though the on-time of semiconductor switching elements 101 and 103 according to the PWM control in a stationary state is ensured. Thus, it can be determined that resuming the PWM control for the stationary operation can be enabled. Accordingly, at time t8, the overcurrent mode ends and current upper limit Ilim is also de-configured.

In other words, at time t8, the control mode is, again, switched to the PWM control mode for the stationary operation. After the control mode is switched to the PWM control mode for the stationary operation, the PWM switching operation is performed using PWM signals Spwm1, Spwm2 in accordance with PWM signal Spwm1*, Spwm2*, and controlled so that reactor current IL follows reactor current command value IL*.

Note that the overcurrent mode can be ended, that is, current upper limit Ilim can be de-configured, provided that a switching control in accordance with PWM signal Spwm1*, Spwm2 does not cause reactor current IL to reach current upper limit Ilim over multiple switching cycles, rather than one cycle only. Doing so can prevent overcurrent from being caused by instability of the control upon the return of the system from disturbance.

Alternatively, the overcurrent mode according to Embodiment 1 having current upper limit Ilim introduced therein, can be ended after an elapse of a predetermined period of time since the start (time t2). Doing so obviates the need for monitoring the voltage or current for the determination as to whether to end the overcurrent mode, thereby allowing a simplified control.

Alternatively, the de-configuration of current upper limit Ilim due to ending of the overcurrent mode can be made at the timing corresponding to a zero crossing of the voltage or current (e.g., system voltage Vsys, reactor current IL, or reactor current command value IL*) on the AC side of power conversion device 100. Doing so resumes the PWM control mode for the stationary operation with the voltage and current being close to zero, thereby preventing overcurrent from occurring again.

Note that the timing at which the PWM switching operation resumes (times t3, t5, t7), ceased by reactor current IL having reached current upper limit Ilim, can be the timing at which PWM signal Spwm2* transitions from L level to H level. In this case, after IL<Ilim is true and the PWM switching operation resumes, semiconductor switching elements 102 and 103 turn on in a period in which PWM signal Spwm2* is at H level, and reactor current IL thereby decreases. Then, PWM signal Spwm2* changes to L level, and PWM signal Spwm1* changes to H level, after which the reactor current IL turns to increase.

In this case, if reactor current IL reaches current upper limit Ilim before the next time the PWM signal Spwm1* changes to L level, the PWM switching operation stops again and the overcurrent mode continues. In contrast, if IL<Ilim continues until the next timing the PWM signal Spwm1* changes to L level, that is, throughout one cycle of PWM signal Spwm1, the overcurrent mode ends at this timing and the control mode is switched to the PWM control mode for the stationary operation.

In the case where the PWM switching operation resumes instantly at the timing at which reactor current IL has decreased less than current upper limit Ilim after the PWM switching operation stops in the overcurrent mode, if the PWM switching operation is resumed during an H level period of PWM signal Spwm1*, reactor current IL may instantly reach current upper limit Ilim and the PWM switching operation may stop again. Accordingly, the timing at which the PWM switching operation resumes is synchronized with PWM signals Spwm1*, Spwm2*, thereby preventing the PWM switching operation from stopping instantly after the PWM switching operation resumes. In FIG. 6, times t3, t5, and t7 correspond to "first timing."

While FIG. 6 illustrates the control operation where system voltage Vsys, reactor current command value IL*, and reactor current IL are positive values, it should be noted that the switching to the overcurrent mode, the setting of current upper limit Ilim (Ilim<0), and the switching from the overcurrent mode to the PWM control mode during the stationary operation can be likewise controlled when system voltage Vsys, reactor current command value IL*, and reactor current IL are negative values. In this case, however, reactor current IL (the absolute value) increases in a period in which PWM signal Spwm2* is at H level. Thus, after PWM switching operation has resumed, the overcurrent mode can be ended if reactor current IL does not reach current upper limit Ilim until the timing at which the PWM signal Spwm2* changes from H level to L level, that is, throughout one cycle of PWM signal Spwm2*.

The example operation of FIG. 6 assumes that the system disturbance converges in a relatively short time and overcurrent of reactor current IL subsides accordingly. However, the condition illustrated at time t8 may not appear for a long while due to a long-lasting system disturbance or abnormalities of power conversion device 100. Accordingly, after the start of the overcurrent mode, preferably, power conversion device 100 stops operation if reactor current IL reaches current upper limit Ilim for a predetermined number of times (e.g., about 5 times), as it does at times t4, t6, t8.

Figure 7:
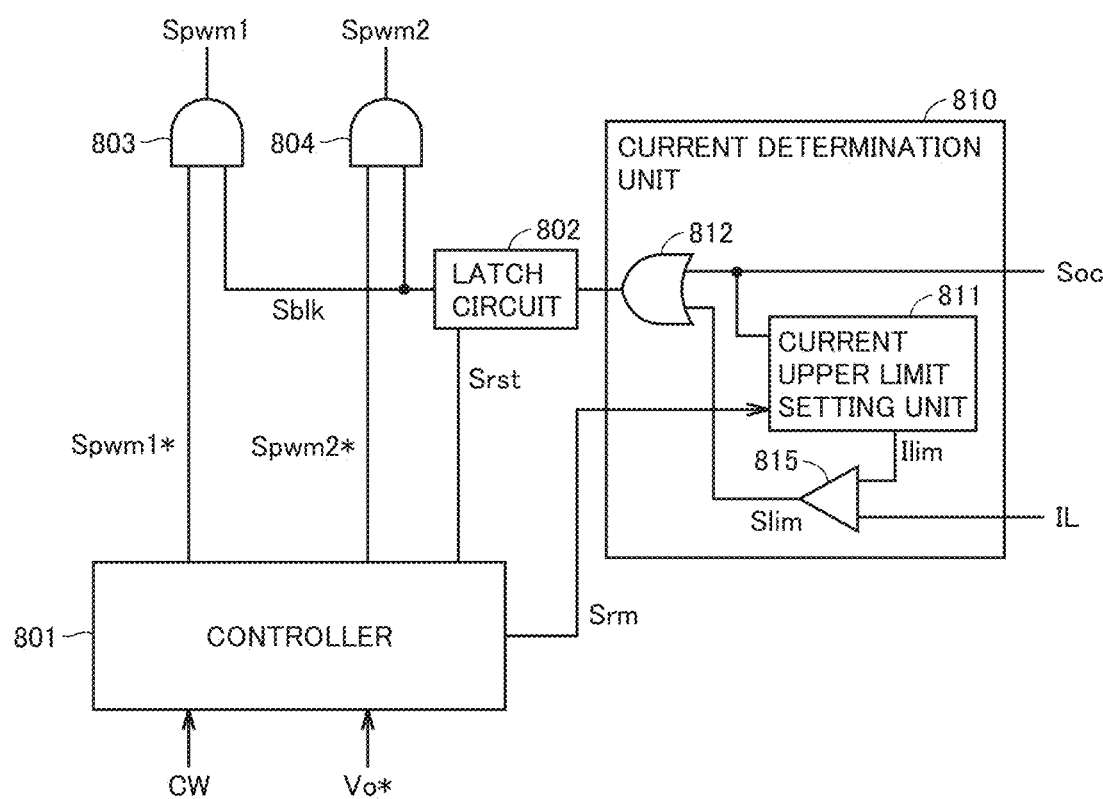
FIG. 7 is a circuit diagram showing details of the PWM signal converter for generating a PWM signal corresponding to the switching of the control mode illustrated in FIG. 6.

FIG. 7 shows a circuit diagram showing a detailed configuration of the PWM signal converter which generates a PWM signal corresponding to the switching of the control mode described with respect to FIG. 6.

Referring to FIG. 7, PWM signal converter 205 includes a controller 801, a latch circuit 802, AND gates 803, 804, and a current determination unit 810. Current determination unit 810 has a current upper limit setting unit 811, an OR gate 812, and a comparator 815. Current determination unit 810 receives overcurrent detection signal Soc from overcurrent detector 122.

Upon receipt of inverter control command value Vo* and carrier wave CW shown in FIG. 2, controller 801 generates PWM signals Spwm1*, Spwm2* through the PWM control as described with respect to FIG. 3. In other words, PWM signals Spwm1*, Spwm2* correspond to PWM signals Spwm1, Spwm2 of FIGS. 3 and 4. In other words, controller 801 is denoted as a functional block that includes the PWM control function shown of FIG. 3, among the functionalities of PWM signal converter 205.

As the overcurrent detection signal Soc changes from L level to H level, current upper limit setting unit 811 starts generation of current upper limit Ilim. Current upper limit setting unit 811 continues to generate current upper limit Ilim until an overcurrent mode release signal Srm from controller 801 is set to H level. As described above, current upper limit setting unit 811 can set current upper limit Ilim in conjunction with reactor current command value IL*. After the control mode switches to the overcurrent mode, overcurrent mode release signal Srm is set to H level if the overcurrent mode termination condition described above is met.

Alternatively, current upper limit Ilim can be generated constantly by controller 801 and sent to current upper limit setting unit 811, and output from controller 801 to comparator 815 at the start of operation of current upper limit setting unit 811 in response to overcurrent detection signal Soc.

Comparator 815 compares reactor current IL detected by current detector 113 with current upper limit Ilim from current upper limit setting unit 811, and outputs a signal Slim. Signal Slim is set to H level when Ir>Ilim is true, while it is set to L level when Ir≤Ilim is true. Note that since reactor current IL and current upper limit Ilmin are AC currents, comparator 815 needs to compare the absolute values of the two or consolidates results of comparison of the two in two lines which are between the positive currents of the two and between the negative currents of the two.

OR gate 812 outputs a result of OR (logical disjunction) operation of signal Slim from comparator 815 and overcurrent detection signal Soc. In other words, the output signal of OR gate 812 is set to H level when reactor current IL is greater than overcurrent threshold Ith (when the overcurrent mode is started) or when reactor current IL is greater than current upper limit Ilim (during the overcurrent mode). Conversely, the output signal of OR gate 812 is at L level in a period and the PWM control mode for the stationary operation is maintained while IL<Ith is true and in a period in which IL<Ilmin is true during the overcurrent mode.

As an H level signal is input from OR gate 812 to latch circuit 802, latch circuit 802 continues to set a block signal Sblk at L level until a reset signal Srst is input from controller 801. As reset signal Srst is input to latch circuit 802, latch circuit 802 returns block signal Sblk to H level if the output signal of OR gate 812 is at L level. Block signal Sblk is kept at H level until an H level signal is input from OR gate 812 to latch circuit 802. During the period in which the output signal of OR gate 812 is at H level, block signal Sblk is kept at L level even if reset signal Srst is input to latch circuit 802.

AND gate 803 outputs a result of AND (logical conjunction) operation of PWM signal Spwm1* from controller 801 and block signal Sblk, as PWM signal Spwm1. Similarly, AND gate 804 outputs a result of AND (logical conjunction) operation of PWM signal Spwm2* from controller 801 and block signal Sblk, as PWM signal Spwm2. PWM signals Spwm1, Spwm2 are input to drive circuit 117.

During the period in which block signal Sblk is at H level, PWM signals Spwm1*, Spwm2* are PWM signals Spwm1, Spwm2. In contrast, during the period in which block signal Sblk is at L level, PWM signals Spwm1, Spwm2 are fixed at L level, irrespective of PWM signals Spwm1*, Spwm2*.

In the control example of FIG. 6, reset signal Srst for returning the block signal Sblk to H level can be input to latch circuit 802 at a timing at which the PWM signal Spwm1* changes to L level or H level (a rising edge), that is, at times t3, t5, t7. Depending on whether system voltage Vsys, reactor current command value IL*, and reactor current IL are positive or negative, the timing of generation of reset signal Srst can also be switched between a rising edge of PWM signal Spwm1* and a rising edge of PWM signal Spwm2*.

According to the configuration of PWM signal converter 205 shown in FIG. 7, the output signal of OR gate 812 is kept at L level and block signal Sblk is kept at H level in the PWM control mode for the stationary operation (IL<Ith), that is, before time t2 of FIG. 6. Thus, PWM signals Spwm1*, Spwm2*, as they are, are used as PWM signals Spwm1, Spwm2.

The output signal of OR gate 812 changes to H level, in response to overcurrent detection signal Soc, if IL>Ith is true and the overcurrent mode starts, that is, at time t3 of FIG. 6, thereby causing block signal Sblk to change to L level. Due to this, PWM signals Spwm1, Spwm2 change to L level, and the PWM switching operation stops.

In a period between time t2 and time t3 of FIG. 6, even if reset signal Srst is generated in response to a rising edge of PWM signal Spwm1*, the output signal of OR gate 812 remains at H level if IL>Ilim is true. Thus, latch circuit 802 keeps block signal Sblk at L level. In other words, the PWM switching operation remains stopped.

At time t3 in FIG. 6, since IL<Ilim is true at the timing of generation of reset signal Srst, the output signal of OR gate 812 returns to L level. Thus, block signal Sblk returns to H level. This sets PWM signals Spwm1, Spwm2 in accordance with PWM signals Spwm1*, Spwm2*, and the PWM switching operation by semiconductor switching elements 101 to 104 thereby resumes.

At time t4 in FIG. 6, the output signal of OR gate 812 changes to H level as an output signal Slim of comparator 815 changes to H level. Latch circuit 802 changes block signal Sblk to L level, accordingly. Thus, PWM signals Spwm1, Spwm2 change to L level, which stops the PWM switching operation again.

As with times t3 and t4, at times t5 and t6 in FIG. 6, the PWM switching operations of semiconductor switching elements 101 to 104 are resumed and stopped by PWM signal converter 205 operating. Furthermore, as with times t3 and t5, at time t7, the PWM switching operation is resumed by PWM signal converter 205 operating. At time t8, the overcurrent mode termination condition described above is met, and controller 801 thus changes the overcurrent mode release signal Srm from H level to L level. Current upper limit setting unit 811 stops outputting current upper limit Ilim, accordingly. Due to this, current upper limit Ilim is de-configured. Overcurrent detection signal Soc and output signal Slim of comparator 815 are both at L level after time t8, which brings the output signal of OR gate 812 into L level and block signal Sblk is set at H level. As a result, PWM signals Spwm1*, Spwm2*, as they are, are used as PWM signals Spwm1, Spwm2 in the PWM control mode for the stationary operation after the overcurrent mode ends, as with before time t2 of FIG. 6.

Note that PWM signal converter 205 may have a configuration different from the configuration of FIG. 7, insofar as PWM signal converter 205 can generate PWM signals Spwm1, Spwm2 in accordance with the operation illustrated in FIG. 6. For example, while PWM signals Spwm1, Spwm2 are generated by AND gates 803, 804 in FIG. 6, PWM signals Spwm1, Spwm2 can be output by a buffer circuit (not shown) and block signal Sblk of FIG. 7 can be input to an enable signal terminal of the buffer circuit. Alternatively, PWM signal converter 205 can be configured by applying FPGA (Field Programmable Gate Array) or the like, as appropriate, so as to have the same functionalities as described above.

Moreover, since PWM signals Spwm1 and Spwm2 are complementary signals, one of PWM signals Spwm1 and Spwm2 can be generated by inverting the other, provided that a dead time needs to be additionally given between the signal before the inversion and the inverted signal.

As described above, according to the power conversion device of Embodiment 1, in the overcurrent mode, the current upper limit is set and whether to end the overcurrent mode is determined based on a comparison of the reactor current with the current upper limit, thereby preventing overcurrent from being caused again instantly after the overcurrent mode ends. As a result, the power conversion device is allowed to continue to operate in a stable manner even in the event of overcurrent in power conversion device 100. In particular, since the current upper limit is set in conjunction with the reactor current command value, when the overcurrent mode ends and the PWM control mode resumes the reactor current behaves in a stable manner, as compared to merely applying a hysteresis to the overcurrent threshold.

Furthermore, in Embodiment 1, the period in which the PWM switching operation performs and the period in which the PWM switching operation is stopped (the current decrease period) are provided alternately, based on the comparison of the reactor current with the current upper limit in conjunction with the reactor current command value. As a result, the reactor current deviation is reduced at the time the PWM control mode resumes following the end of the overcurrent mode. Thus, the behavior of the reactor current after the PWM control mode resumes can further be stabilized.

During the overcurrent mode, the timing at which the PWM switching operation starts is synchronized with PWM signals Spwm1*, Spwm2*, thereby allowing the PWM switching operation to be performed in a stable manner. Thus, reactor current IL can be approximated to reactor current command value IL*.

Variation of Embodiment 1

In a variation of Embodiment 1, a control for smoothly returning the control mode from the overcurrent mode to the PWM control mode for the stationary operation will be described. Embodiment 1 has been described with reference to the control of turning semiconductor switching elements 101 to 104 all off to stop the PWM switching operation in the overcurrent mode, as described with respect to FIG. 6. In the variation of Embodiment 1, in contrast, the control of turning on some of the semiconductor switching elements that do not cause an increase in reactor current IL is performed to stop the PWM switching operation, rather than turning semiconductor switching elements 101 to 104 all off.

Figure 8:
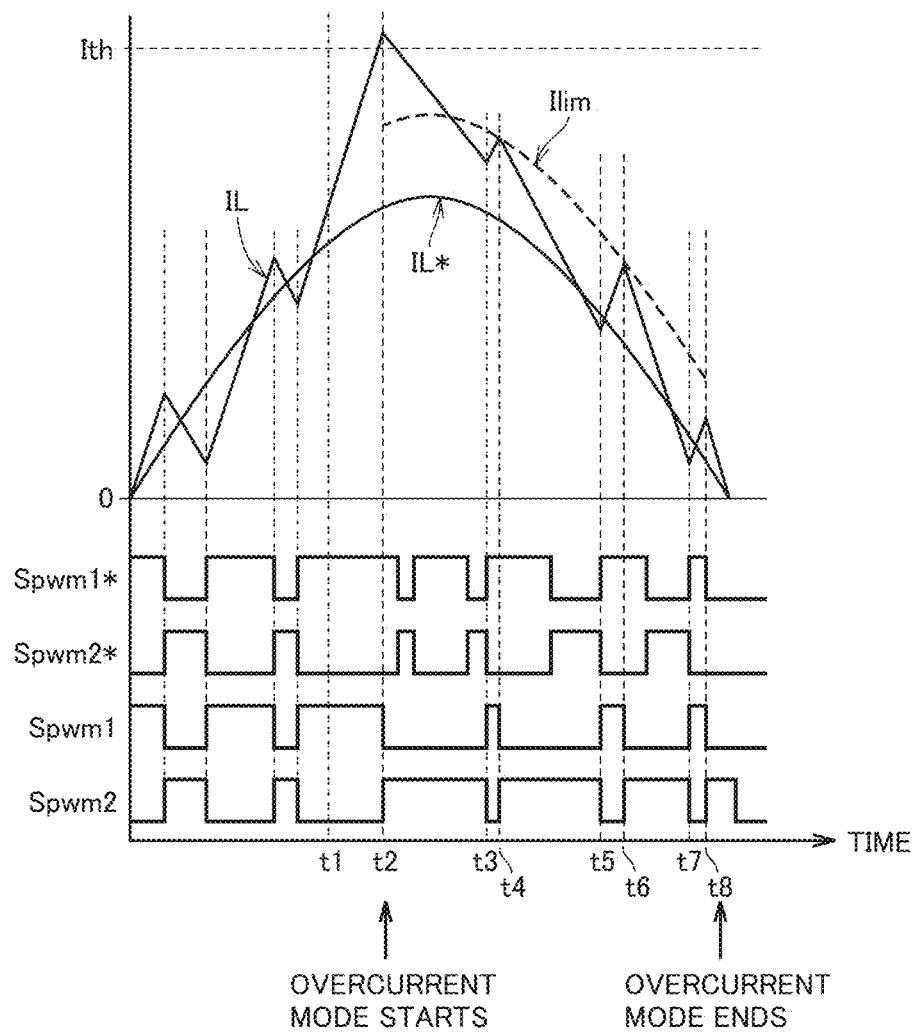
FIG. 8 is a schematic waveform diagram for illustrating switching of the control mode when overcurrent is detected in the power conversion device according to a variation of Embodiment 1.

FIG. 8 shows a schematic waveform diagram for illustrating the switching of the control mode upon detection of overcurrent in power conversion device 100 according to the variation of Embodiment 1. FIG. 8 illustrates a control where reactor current IL changes, as with FIG. 6. In other words, the waveforms of reactor current IL, reactor current command value IL*, and current upper limit Ilim are the same as those illustrated in FIG. 6.

FIG. 8 also illustrates the control operation that is performed in a time period in which system voltage Vsys, reactor current command value IL*, and reactor current IL are all positive values. In this case, power is supplied from the DC side to the AC side in a time period in which semiconductor switching elements 101 and 104 are on. Accordingly, in a time period in which system voltage Vsys, reactor current command value IL*, and reactor current IL are positive values, reactor current IL does not increase but decreases even when semiconductor switching elements 102 and 103 are on.

For this reason, in the variation of Embodiment 1, semiconductor switching elements 101 and 104 are turned off (Spwm1=L level), while semiconductor switching elements 102 and 103 are turned on (Spwm2=H level) at times t2, t4, t6 at which the PWM switching operation stops after the overcurrent mode starts. In response to this, reactor current IL decreases after times t2, t4, t6, as with FIG. 6.

At times t3, t5, t7, the PWM switching operation resumes under the same conditions as FIG. 6, and reactor current IL thereby turns to increase. As with FIG. 6, at times t4, t6, reactor current IL reaches current upper limit Ilim, thereby causing the PWM switching operation to stop in a mode in which semiconductor switching elements 101 and 104 are off and semiconductor switching elements 102 and 103 are on, as described above.

As with FIG. 6, the overcurrent mode ends and current upper limit Ilim is also de-configured at time t8. Note that the overcurrent mode termination condition can also be set in the variation of Embodiment 1, in a similar manner as described in Embodiment 1.

Although no dead time is depicted also in FIG. 8, a dead time is, in practice, given, as with FIG. 3, when each of PWM signals Spwm1, Spwm2 changes from L level to H level. In FIG. 8, the PWM switching operation stops and semiconductor switching elements 101, 104 are turned off during the periods from time t2 to t3, time t4 to time t5, and time t6 to time t7, thereby providing "current decrease period" in which reactor current IL monotonically decreases.

Figure 9:
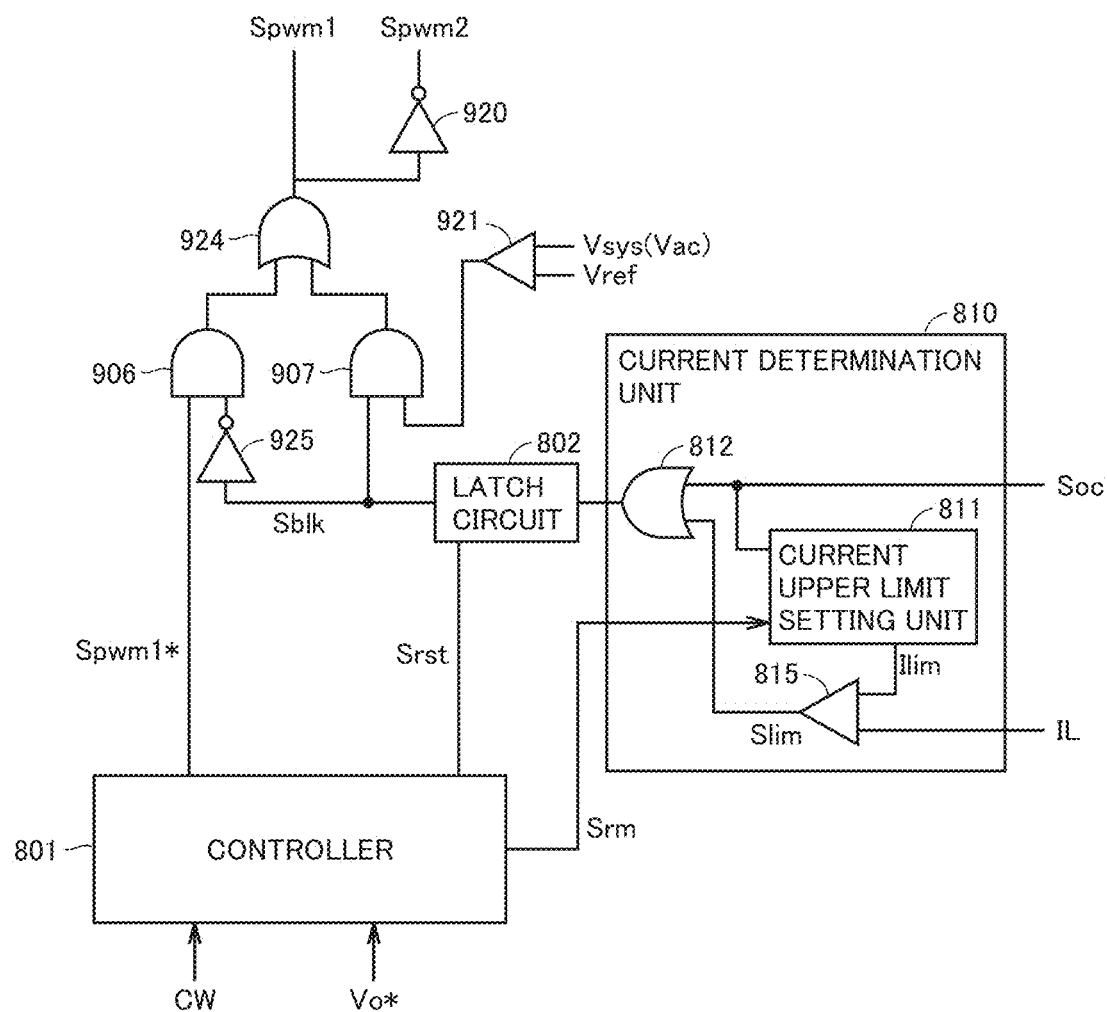
FIG. 9 is a circuit diagram showing details of a configuration of a PWM signal converter corresponding the switching of the control mode according to the variation of Embodiment 1.

FIG. 9 illustrates a circuit diagram showing a detailed configuration of PWM signal converter 205 corresponding to the switching of the control mode according to the variation of Embodiment 1 described with respect to FIG. 8.

Referring to FIG. 9, PWM signal converter 205 includes controller 801, latch circuit 802, current determination unit 810, a comparator 921, NOT gates 920, 925, AND gates 906, 907, and an OR gate 924.

Controller 801, latch circuit 802, current determination unit 810 operate in a similar manner as described with respect to FIG. 7. Note that controller 801 can generate PWM signal Spwm1*, without giving a dead time, which is different from PWM signal Spwm1 of FIGS. 3 and 4. This is because, according to the configuration of FIG. 9, a dead time is given to PWM signals Spwm1, Spmw2 at the final stage, as described below.

The signal that is input from OR gate 812 included in current determination unit 810 to latch circuit 802, and reset signal Srst that is input from controller 801 to latch circuit 802 are the same as those shown in FIG. 6. Thus, block signal Sblk that is output from latch circuit 802 is set in a similar manner as described with respect to FIG. 7. In other words, block signal Sblk is set to H level in the PWM switching operation stop period during the overcurrent mode, and block signal Sblk is set to L level in the other periods.

Comparator 921 compares system voltage Vsys detected by voltage detector 111 with a reference voltage Vref. Reference voltage Vref being 0 (V) allows determination as to whether system voltage Vsys is a positive voltage or a negative voltage. In the example of FIG. 9, suppose that the output signal of comparator 921 is at L level when Vsys is a positive voltage (Vsys>Vref), and the output signal of comparator 921 is H level when Vsys is a negative voltage (Vsys<Vref). Note that the polarity of commercial system 130 can also be determined by inputting, to comparator 921, voltage Vac of capacitor 109 detected by voltage detector 112 or reactor current IL detected by current detector 113, instead of system voltage Vsys.

AND gate 906 outputs a result of AND (logical conjunction) operation of PWM signal Spwm1* from controller 801 and the inverted signal of block signal Sblk by NOT gate 925. AND gate 907 outputs a result of AND (logical conjunction) operation of the output signal of comparator 921 and block signal Sblk. OR gate 924 outputs a result of OR (logical disjunction) operation between the output signal of AND gate 906 and the output signal of AND gate 907, as PWM signal Spwm1. NOT gate 920 outputs the inverted signal of PWM signal Spwm1, as PWM signal Spwm2. These PWM signals Spwm1 and Spwm2 are passed through a dead-time giving circuit (not shown) and then input to drive circuit 117. For example, the dead-time giving circuit can be configured to perform AND (logical operation) of PWM signal Spwm1 (Spwm2) and PWM signal Spwm1 (Spwm2) having passed through the delay stage, thereby giving only a rising edge from L level to H level a delay corresponding to a dead time.

When block signal Sblk is at L level, a signal at H level is input from NOT gate 925 to AND gate 906. Thus, the output signal of AND gate 906 is PWM signal Spwm1*. Meanwhile, the output signal of AND gate 907 is fixed at L level, irrespective of the output signal of comparator 921 (i.e., the polarity of system voltage Vsys). Accordingly, PWM signal Spwm1* is output as PWM signal Spwm1 from OR gate 924, the inverted signal of PWM signal Spwm1* is output as PWM signal Spwm1 from NOT gate 920. Accordingly, semiconductor switching elements 101 to 104 is allowed to perform the PWM switching operation based on PWM signal Spwm1*(Spwm2*).

In contrast, when block signal Sblk is at H level, the operation of PWM signal converter 205 depends on the polarity of system voltage Vsys. In the period in which block signal Sblk is at H level, since a signal at L level is input from NOT gate 925 to AND gate 906, the output signal of AND gate 906 is fixed at L level. Meanwhile, the output signal of AND gate 907 is at L level if the output signal of comparator 921 is at L level (Vsys>0), while the output signal of AND gate 907 is at H level if the output signal of comparator 921 is at H level (Vsys<0).

Accordingly, in a period in which block signal Sblk is at H level, if system voltage Vsys is a positive voltage (Vsys>0), PWM signal Spwm1 is set to L level and PWM signal Spwm2 is set to H level. Due to this, when Vsys>0 is true, semiconductor switching elements 101 and 104 that form the path for sending the energy from the DC side to the AC side are turned off, while semiconductor switching elements 102 and 103 that operate in complementary manner are turned on. Such turning on and off of semiconductor switching elements 101 to 104 corresponds to "second switching operation" that is performed when system voltage Vsys is a positive voltage.

Conversely, in a period in which block signal Sblk is at H level, when system voltage Vsys is a negative voltage (Vsys<0), PWM signal Spwm2 is set to L level and PWM signal Spwm1 is set to H level. Due to this, when Vsys<0 is true, semiconductor switching elements 102 and 103 that form a path for sending energy from the DC side to the AC side are turned off, while semiconductor switching elements 101 and 104 that operate in complementary manner are turned on. Such turning on and off of semiconductor switching elements 101 to 104 corresponds to "second switching operation" that is performed when system voltage Vsys is a negative voltage.

As a result, in the PWM switching operation stop period during the overcurrent mode, some of the semiconductor switching elements that form the path for sending energy from the DC side to the AC side can be turned off, while the remaining semiconductor switching element system can be turned on, depending on the polarity of voltage Vsys.

As such, as with the variation of Embodiment 1, the same advantages effects as Embodiment 1 can be obtained even if the control of turning on some of the semiconductor switching elements that do not contribute to an increase of reactor current IL, is performed in the PWM switching operation stop period during the overcurrent mode. Furthermore, since the difference in terms of the switching operation between the overcurrent mode and the PWM control mode is reduced, the control mode can switch from the overcurrent mode to the PWM control mode more smoothly than Embodiment 1.

Note that the configuration of PWM signal converter 205 may be different from that shown in FIG. 9, insofar as PWM signal converter 205 is capable of generating PWM signals Spwm1, Spwm2 in accordance with the operation illustrated in FIG. 8. For example, as with Embodiment 1, PWM signal converter 205 can be configured, as appropriate, to have the same functionalities as those of the configuration shown in FIG. 9 by applying a buffer circuit or FPGA, for example.

Embodiment 2

Embodiment 2 will be described with reference to another control example in the overcurrent mode described in Embodiment 1 and the variation thereof. In other words, the configuration of power conversion device 100 (FIG. 1) and the PWM control for the stationary operation are the same as Embodiment 1.

Figure 10:
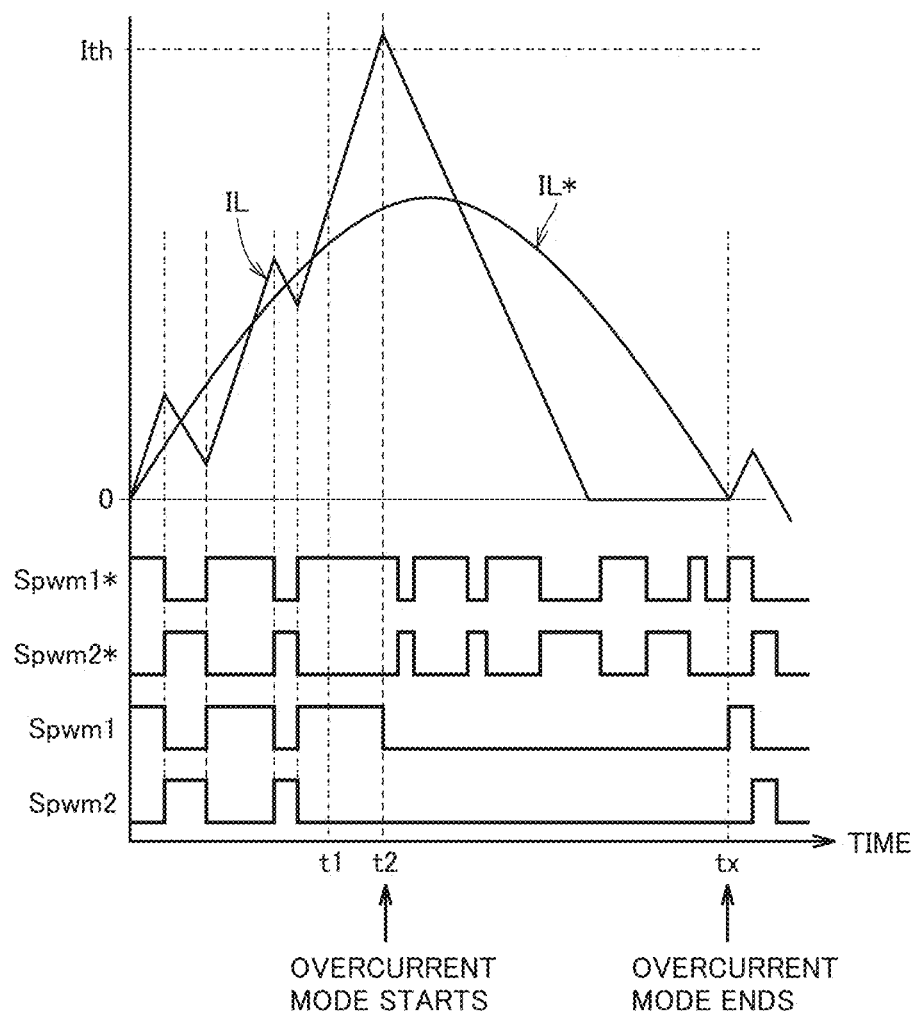
FIG. 10 is a schematic waveform diagram for illustrating switching of a control mode when overcurrent is detected in a power conversion device according to Embodiment 2.

FIG. 10 shows a schematic waveform diagram for illustrating switching of the control modes when overcurrent is detected in a power conversion device 100 according to Embodiment 2. In FIG. 10, the waveform of reactor current command value IL* is the same as those illustrated in FIGS. 6 and 8, and the figure illustrates a control operation in a period in which system voltage Vsys, reactor current command value IL*, and reactor current IL are positive.

In FIG. 10 also, the overcurrent mode starts at time t2 due to an occurrence of system disturbance at time t1. Before time t2, PWM signals Spwm1, Spwm2 are set in accordance with PWM signals Spwm1*, Spwm2*, and thus semiconductor switching elements 101 to 104 perform the PWM switching operation.

In Embodiment 2, semiconductor switching elements 101 to 104 are all kept off during the overcurrent mode, without performing the comparison of reactor current IL with current upper limit Ilim, as in Embodiment 1. In other words, from when the overcurrent mode ends at time tx until the control mode is switched to the PWM control mode, PWM signals Spwm1, Spmw2 are fixed at L level, irrespective of PWM signals Spwm1*, Spwm2*. As a result, during the overcurrent mode, reactor current IL monotonically changes toward zero, and as reactor current IL is kept at zero after it reaches IL=0.

At time tx, the overcurrent mode ends in response to a zero crossing point of reactor current command value IL* being sensed. In other words, time tx corresponds to "second timing." In FIG. 10, the PWM switching operation stops and semiconductor switching elements 101 to 104 turn off throughout a time period from time t2 to tx, and a "current decrease period" is thereby provided in which reactor current IL monotonically decreases.

After time tx, semiconductor switching elements 101 to 104, by using PWM signals Spwm1, Spwm2 according to PWM signal Spwm1*, Spwm2*, performs the PWM switching operation for causing reactor current IL to follow reactor current command value IL*, as with prior to time t2.

As illustrated in FIG. 10, the control operation by proportional-integral controller 204 (FIG. 2) continues and PWM signals Spwm1*, Spwm2* are generated even during the overcurrent mode. Meanwhile, in Embodiment 2, a divergence between reactor current IL and reactor current command value IL* may increase during the overcurrent mode. Accordingly, preferably, the value of the integral term (Ki*Σ(ΔIL)) is once cleared to zero at the time of switching from the overcurrent mode to the PWM control mode so that the integration of current deviation ΔIL during the overcurrent mode is cleared. Alternatively, the operation of the integral term (in particular, integration of current deviation ΔIL) at proportional-integral controller 204 may be temporality stopped during the overcurrent mode.

Figure 11:
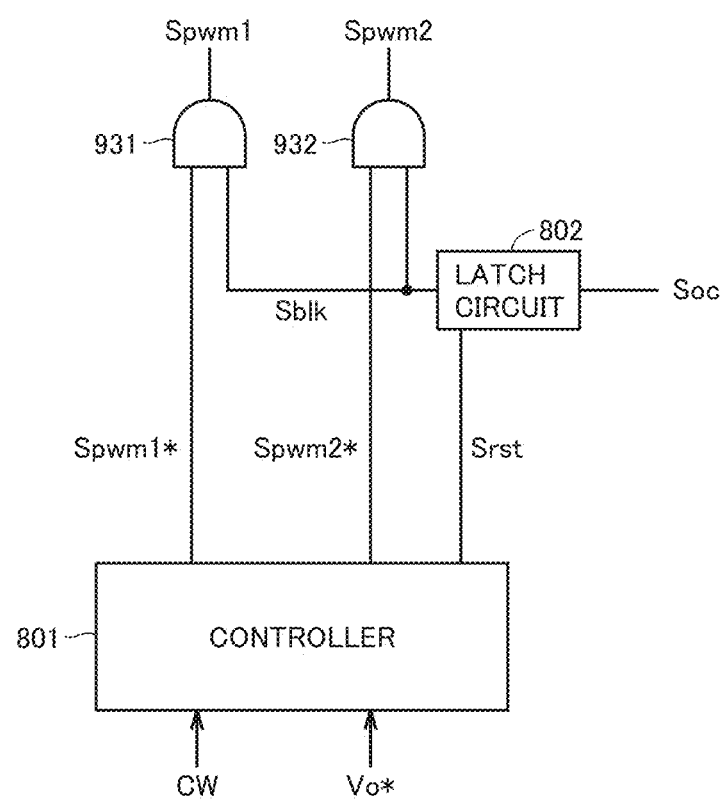
FIG. 11 is a circuit diagram showing details of a configuration of a PWM signal converter corresponding to the switching of the control mode, according to Embodiment 2.

FIG. 11 is a circuit diagram showing a detailed configuration of PWM signal converter 205 corresponding to the switching of the control mode according to Embodiment 2 described in FIG. 10.

Referring to FIG. 11, PWM signal converter 205 includes controller 801, latch circuit 802, and AND gates 931, 932.

Controller 801 operates in a similar manner as described with respect to FIG. 7, and outputs reset signal Srst, and PWM signals Spwm1*, Spwm2* for the PWM switching operation. In Embodiment 2, reset signal Srst is generated at the timing of a zero crossing (time tx of FIG. 10) of reactor current command value IL*. As described with respect to FIGS. 2 and 3, reactor current command value IL* is generated inside the control circuit 115, and controller 801 can thus readily sense that timing of zero crossing. Alternatively, the timing of generation of reset signal Srst can be determined in correspondence with system voltage Vsys detected by voltage detector 111 and a zero-cross point of reactor current IL detected by current detector 113, as another zero-cross point of the voltage or current on the AC side of power conversion device 100.

Overcurrent detection signal Soc from overcurrent detector 122 is input to latch circuit 802, instead of the output signal from current determination unit 810 in FIGS. 9 and 11. Accordingly, as overcurrent detection signal Soc changes to H level, latch circuit 802 keeps setting the block signal Sblk at L level, until it receives reset signal Srst from controller 801. As reset Srst is input to latch circuit 802, if overcurrent detection signal Soc is at L level, latch circuit 802 returns block signal Sblk to H level. Accordingly, block signal Sblk changes from H level to L level at time t2 of FIG. 10, and is kept at L level in a period from time t2 to tx. After time tx, block signal Sblk is set at H level.

AND gate 931 outputs a result of AND (logical conjunction) operation of PWM signal Spwm1* from controller 801 and block signal Sblk, as PWM signal Spwm1. Similarly, AND gate 932 outputs a result of AND (logical conjunction) operation of PWM signal Spwm2* from controller 801 and block signal Sblk, as PWM signal Spwm2. PWM signals Spwm1, Spwm2 are input to drive circuit 117.

In the period in which block signal Sblk is at H level, PWM signals Spwm1*, Spwm2*, as they are, are used as PWM signals Spwm1, Spwm2. In contrast, in a period in which block signal Sblk is at L level, PWM signals Spwm1, Spwm2 are fixed at L level, irrespective of PWM signals Spwm1*, Spwm2*.

According to the configuration of PWM signal converter 205 shown in FIG. 11, PWM signals Spwm1, Spwm2 can have the same level as PWM signals Spwm1*, Spwm2*, as illustrated in FIG. 10, before time t2 and after time tx of FIG. 10, at which the PWM control mode for the stationary operation is selected. In contrast, PWM signals Spwm1, Spwm2 can be fixed at L level at times in a time period from t2 to tx of FIG. 10 in which the overcurrent mode is applied.

Note that the configuration of PWM signal converter 205 may be different from that shown in FIG. 11, insofar as PWM signal converter 205 is capable of generating PWM signals Spwm1, Spwm2 in accordance with the operation illustrated in FIG. 10. For example, as with Embodiment 1, PWM signal converter 205 can be configured, as appropriate, to have the same functionalities as those of the configuration shown in FIG. 11 by applying a buffer circuit or FPGA, for example. One of PWM signals Spwm1 and Spwm2 can be generated by inverting the other, provided that a dead time needs to be additionally given between the signal before the inversion and the inverted signal, as described in Embodiment 1.

As described above, according to the power conversion device of Embodiment 2, reactor current IL can be decreased in the overcurrent mode that starts in a similar manner as described in Embodiment 1, and the control mode can be switched from the overcurrent mode to the PWM control mode for the stationary operation at the zero crossing timing in accordance with the voltage or current (typically, reactor current command value IL*) on the AC side of power conversion device 100.

This reduces the current deviation of reactor current IL from reactor current command value IL* immediately after the resumption of the PWM control mode, and thus the current control is allowed to resume in a stable manner. Even if the timing to switch the control mode is deviated from the zero crossing due to late detections, etc. the control operation can be prevented from becoming unstable because the PWM control for causing reactor current IL to follow reactor current command value IL* starts when reactor current IL is relatively small.

Note that Embodiment 1 and the variation thereof may be combined with Embodiment 2 to define the timing to end the overcurrent mode in correspondence with the zero crossing timing of an alternating-current waveform (typically, reactor current command value IL*) according to commercial system 130.

Embodiment 3

In Embodiment 3, application of the overcurrent mode according to the present embodiment to another example configuration of the power conversion device will be described.

Figure 12:
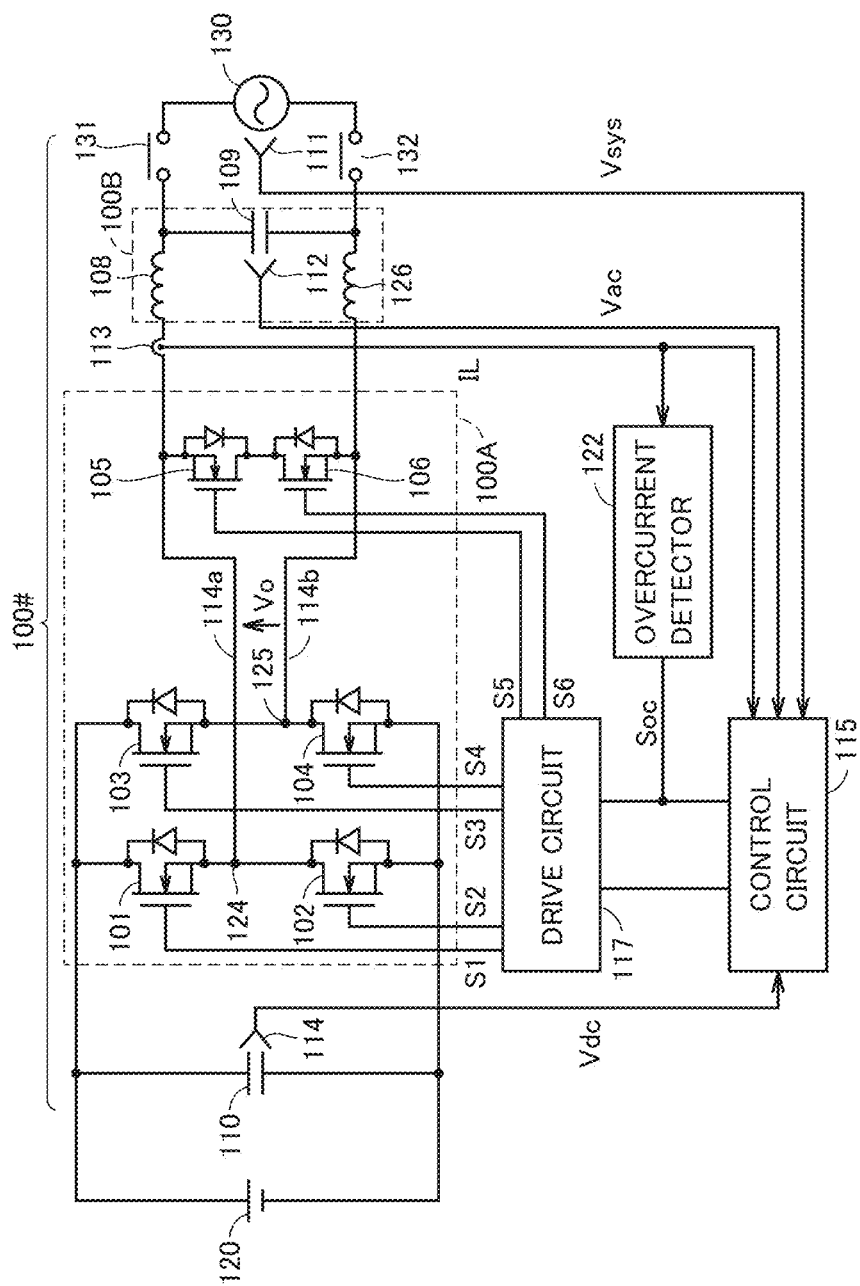
FIG. 12 is a circuit diagram showing a configuration of a power conversion device according to Embodiment 3.

FIG. 12 is a circuit diagram showing a configuration of the power conversion device according to Embodiment 3.

Referring to FIG. 12, a power conversion device 100# according to Embodiment 3 is different from power conversion device 100 (FIG. 1) according to Embodiment 1 in that power conversion device 100# includes an inverter circuit 100A which further includes semiconductor switching elements 105 and 106. Semiconductor switching elements 105 and 106 can be configured of the same elements as semiconductor switching elements 101 to 104. Semiconductor switching elements 105 and 106 are electrically connected in series between connection points 124 and 125. Semiconductor switching element 105 has a positive electrode electrically connected to connection point 124, semiconductor switching element 106 has a negative electrode electrically connected to connection point 125, and a negative electrode of semiconductor switching element 105 and a positive electrode of semiconductor switching element 106 are electrically connected.

Drive circuit 117 outputs drive control signals S5 and S6 to the control electrodes of semiconductor switching elements 105 and 106. Due to this, as with semiconductor switching elements 101 to 104, semiconductor switching element 105,106 are also allowed to turn on and off in accordance with the control signal (PWM signals Spwm1, Spwm2) from control circuit 115.

Specifically, when system voltage Vsys is a positive voltage, semiconductor switching elements 101 and 104 are turned on and off by the PWM control, while semiconductor switching element 106 is turned on and off complementary to semiconductor switching elements 101 and 104. Furthermore, semiconductor switching element 105 is fixed to on, while semiconductor switching elements 102 and 103 are fixed to off. Owing to this, the PWM control according to PWM signals Spwm1*, Spwm2* of FIG. 3 can be implemented.

In contrast, when system voltage Vsys is a negative voltage, semiconductor switching elements 102 and 103 are turned on and off by the PWM control, while semiconductor switching element 105 is turned on and off complementary to semiconductor switching elements 102 and 103. Furthermore, semiconductor switching element 106 is fixed to on, while semiconductor switching elements 101 and 104 are fixed to off. Owing to this, the PWM control according to PWM signals Spwm1*, Spwm2* of FIG. 3 can be implemented.

In power conversion device 100# according to Embodiment 3, inverter output voltage Vo between connection points 124 and 125 changes at three levels: +Vdc (when semiconductor switching elements 101 and 104 are on); zero (when semiconductor switching elements 105 and 106 are on), and −Vdc (when semiconductor switching elements 102 and 103 are on). For this reason, power conversion device 100# is also referred to as a three-level inverter.

The overcurrent mode (FIG. 6), described in Embodiment 1, is also applicable to power conversion device 100# according to Embodiment 3.

Referring to FIGS. 6 and 11, when system voltage Vsys is a positive voltage, semiconductor switching elements 101 and 104 are turned on and off in accordance with PWM signal Spwm1 (S1=S4=Spwm1), and semiconductor switching element 106 is turned on and off in accordance with PWM signal Spwm2 (S6=Spwm2). Meanwhile, semiconductor switching elements 102 and 103 are fixed to off and semiconductor switching element 105 is fixed to on, as described above. Owing to this, in the PWM control mode (before time t2 and after time t8), reactor current IL can be controlled by the PWM switching operations by semiconductor switching elements 101 to 106 so that reactor current IL follows the reactor current command value.

In the PWM switching operation stop period during the overcurrent mode, semiconductor switching elements 101 to 104 and 106 are turned off by making the following settings: PWM signal Spwm1=Spwm2=L level, thereby achieving reduced reactor current IL. Semiconductor switching element 105 may be continued to be fixed to on or may be turned off as with the other semiconductor switching elements 101 to 104 and 106 being off. There are trade-offs in the following respects.

If semiconductor switching element 105 is fixed to on even during the overcurrent mode, reactor current IL gradually decreases, passing through semiconductor switching element 105 and the freewheeling diode of semiconductor switching element 106, while semiconductor switching elements 101 to 104 are off. In this case, the way of control of semiconductor switching element 105 can be shared between the overcurrent mode and the PWM control mode.

In contrast, if semiconductor switching element 105 is turned off during the overcurrent mode, reactor current IL gradually decreases, passing through a path including the freewheeling diodes of semiconductor switching elements 102 and 103 and smoothing capacitor 110, while semiconductor switching elements 101 to 104 are off. As a result, as compared to fixing semiconductor switching element 105 to on, the rate of decrease of reactor current IL can be accelerated.

Conversely, when system voltage Vsys is a negative voltage, semiconductor switching elements 102 and 103 are turned on and off in accordance with PWM signal Spwm2 (S2=S3=Spwm2), and semiconductor switching element 105 is turned on and off in accordance with PWM signal Spwm1 (S5=Spwm1). Meanwhile, semiconductor switching elements 101 and 104 are fixed to off and semiconductor switching element 106 is fixed to on. Owing to this, in the PWM control mode, reactor current IL can be controlled by the PWM switching operations by semiconductor switching elements 101 to 106 so that reactor current IL follows the reactor current command value.

In the PWM switching operation stop period during an overcurrent mode, semiconductor switching elements 101 to 104 and 106 are turned off by making the following settings: PWM signal Spwm1=Spwm2=L level, thereby achieving reduced reactor current IL, as with the case where system voltage Vsys is a positive voltage. As described above, semiconductor switching element 105 may be continued to be fixed to on, or may be turned off as with the other semiconductor switching elements 101 to 104 and 106 being turned off.

Note that the overcurrent mode (FIG. 8) described in the variation of Embodiment 1 is also applicable to power conversion device 100# according to Embodiment 3.

Referring to FIGS. 8 and 12, in the PWM switching operation stop period during the overcurrent mode according to the variation of Embodiment 1, PWM signal Spwm1 is set at L level and PWM signal Spwm2 is set H level if at system voltage Vsys is a positive voltage. Thus, semiconductor switching elements 101 to 104 are turned off while semiconductor switching element 106 is turned on. For this reason, in the PWM switching operation stop period, reactor current IL can be reduced, irrespective of whether semiconductor switching element 105 is on or off In the PWM switching operation stop period during the overcurrent mode, if system voltage Vsys is a negative voltage, PWM signal Spwm1 is set to H level and PWM signal Spwm2 is set to L level. Accordingly, semiconductor switching elements 101 to 104 are turned off and semiconductor switching element 105 is turned on. For this reason, in the PWM switching operation stop period, reactor current IL can be reduced, as with the variation of Embodiment 1, irrespective of whether semiconductor switching element 106 is on or off.

The overcurrent mode (FIG. 10) described in Embodiment 2 is also applicable to power conversion device 100# according to Embodiment 3.

Referring to FIGS. 10 and 12, during the overcurrent mode, if system voltage Vsys is a positive voltage, semiconductor switching elements 101 to 104 and 106 are turned off by making the following settings: PWM signal Spwm1=Spwm2=L level, thereby achieving reduced reactor current IL. If system voltage Vsys is a negative voltage, reactor current IL can be reduced by turning semiconductor switching elements 101 to 104, 105 off. Accordingly, the switching of the overcurrent mode and the PWM control mode for the stationary operation, as with Embodiment 2, can be implemented by ending the overcurrent mode at the zero crossing timing of an alternating-current waveform (typically, reactor current command value IL*) according to commercial system 130.

As such, the overcurrent mode described in Embodiment 1 and the variation thereof and Embodiment 2 can be switched from the PWM control mode for the stationary operation and applied also to power conversion device 100# configured of a three-level inverter. The power conversion device may have any other circuit structure, for example, a multi-level (three-level or higher) inverter, and the same overcurrent mode can be switched from the PWM control mode for the stationary operation and applied to the multi-level inverter.

The presently disclosed embodiment should be considered in all aspects as illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST 100, 100# power conversion device; 100A inverter circuit; 100B output filter circuit; 101 to 106 semiconductor switching element; 108, 126 reactor (output filter circuit); 109 capacitor (output filter circuit); 110 smoothing capacitor; 111, 112, 114 voltage detector; 113 current detector; 114a, 114b power line; 115 control circuit; 117 drive circuit; 120 DC power supply; 122 overcurrent detector; 123, 815, 921 comparator; 124, 125 connection point; 130 commercial system; 131,132 relay; 200, 801 controller; 203 operation unit; 204 proportional-integral controller; 205 PWM signal converter; 802 latch circuit; 810 current determination unit; 811 current upper limit setting unit; CW carrier wave; IL reactor current; IL* reactor current command value; Ilim current upper limit; Ith overcurrent threshold; S1 to S6 drive control signal (semiconductor switching element); Sblk block signal; Spwm1, Spmw2 PWM signal; Spwm1*; Spwm2* PWM signal (reference); Soc overcurrent detection signal; Srm overcurrent mode release signal; Srst reset signal; Td dead time; V* PWM voltage command; Vo inverter output voltage; Vo* inverter control command value; Vref reference voltage (0V); and Vsys system voltage.

The invention claimed is:

1. A power conversion device, comprising:
an inverter circuit including a plurality of semiconductor switching elements, to convert a direct-current (DC) power on a DC side of the power conversion device to an alternating-current (AC) power and output the AC power from an AC side of the power conversion device;
a current detector to detect an AC current output from the AC side;
a control circuit to control operation of the inverter circuit, based on the AC current detected by the current detector; and
a drive circuit to control on and off of the plurality of semiconductor switching elements, in accordance with a control signal from the control circuit, wherein
when the control circuit is in a first control mode of controlling the inverter circuit so that the AC current follows an AC current command value, if the AC current increases greater than a predetermined overcurrent threshold, the control circuit switches from the first control mode to a second control mode to control the inverter circuit under the second control mode, wherein the first control mode is a PWM control mode and the second control mode is an overcurrent mode,
when the control circuit is in the second control mode, the control circuit controls the inverter circuit so that current decrease periods are provided in which the on and off of the plurality of semiconductor switching elements are controlled so that the AC current monotonically decreases, by stopping a first switching operation in which on and off of the plurality of semiconductor switching elements are controlled so that the AC current follows the AC current command value, wherein all of the plurality of switching elements are turned off in each of the current decrease periods of the second control mode,
wherein:
in the second control mode, a current upper limit is set within a range less than the overcurrent threshold and greater than the AC current command value, and
the control circuit provides the current decrease periods in response to a transition from the first control mode to the second control mode, and further provides in the second control mode current increase periods which each end when the AC current reaches the current upper limit at different times, alternately with the current decrease periods in the second control mode.

2. The power conversion device according to claim 1, wherein
based on a comparison of the AC current with the current upper limit, determines whether to end the second control mode and switch to the first control mode.

3. The power conversion device according to claim 2, wherein
in the first switching operation, the control signal is generated in accordance with a cyclic control pulse signal for causing the AC current to follow the AC current command value, the cyclic control pulse signal having a duty ratio which varies for each cycle,
in the second control mode, when the AC current reaches the current upper limit during the first switching operation, the control circuit stops the first switching operation and starts a current decrease period of the current decrease periods, and the control circuit
- generates the control pulse signal based on the AC current which is detected by the current detector throughout the first control mode and the second control mode, and
- when the AC current is less than the current upper limit at a first timing synchronized with the control pulse signal in the current decrease period during the second control mode, ends the current decrease period and resumes the first switching operation.

4. The power conversion device according to claim 3, wherein
- in the first switching operation when the control circuit is in the second control mode, if the AC current is less than the current upper limit throughout one or more cycles of the control pulse signal, the control circuit ends the second control mode and switches to the first control mode, to control the inverter circuit under the first control mode.

5. The power conversion device according to claim 1, wherein
- when in the second control mode, at a second timing corresponding to a zero-cross point of the AC current command value or an AC voltage on the AC side, the control circuit ends the second control mode, and switches to the first control mode, to control the inverter circuit under the first control mode.

6. The power conversion device according to claim 5, wherein
the control circuit
- generates the control signal throughout the second control mode so that the plurality of semiconductor switching elements are all turned off, and
- at a timing corresponding to the zero-cross point of the AC current command value or the AC voltage on the AC side, ends the second control mode, and switches to the first control mode, to control the inverter circuit under the first control mode.

7. The power conversion device according to claim 1, wherein
- the AC side is electrically connected to a commercial system, and
- the AC current command value is set in accordance with a sine wave having a same frequency as the commercial system.

8. The power conversion device according to claim 1, wherein the control circuit ends the second control mode and switches to the first control mode in accordance with the timing corresponding to the zero-cross point of the voltage or current on the AC side.

9. The power conversion device according to claim 1, wherein the AC current command value cyclically changes.

10. The power conversion device according to claim 1, wherein the AC current command value is a sine wave.

\* \* \* \* \*